United States Patent [19]
Lennen

[11] Patent Number: 5,825,887
[45] Date of Patent: Oct. 20, 1998

[54] TRANSMITTING AND RECEIVING APPARATUS FOR FULL CODE CORRELATION OPERATION UNDER ENCRYPTION FOR SATELLITE POSITIONING SYSTEM

[75] Inventor: Gary R. Lennen, Cupertino, Calif.

[73] Assignee: Trimble Navigation Limited, Sunnyvale, Calif.

[21] Appl. No.: 580,353

[22] Filed: Dec. 28, 1995

[51] Int. Cl.[6] ................................. G01S 5/02; H04L 9/00
[52] U.S. Cl. ........................... 380/34; 342/357; 342/352
[58] Field of Search ..................... 364/449.7; 342/357, 342/352; 380/49, 34; 701/213, 214, 215

[56] References Cited

U.S. PATENT DOCUMENTS

| | | | |
|---|---|---|---|
| 4,457,006 | 6/1984 | Maine | 375/333 |
| 4,809,005 | 2/1989 | Counselman, III | 342/352 |
| 5,293,170 | 3/1994 | Lorenz et al. | 342/352 |
| 5,495,499 | 2/1996 | Fenton et al. | 380/48 X |
| 5,541,606 | 7/1996 | Lennen | 342/357 |
| 5,576,715 | 11/1996 | Litton et al. | 342/357 |

*Primary Examiner*—Thomas H. Tarcza
*Assistant Examiner*—Pinchus M. Laufer
*Attorney, Agent, or Firm*—Boris G. Tankhilevich

[57] ABSTRACT

The transmitting and receiving apparatus and method for full code correlation operation under encryption for the Satellite Positioning System (SATPS) are disclosed. The apparatus includes a central station designed to receive SATPS satellites encoded information using a high gain antenna and a delayed correlation receiver. The central station extracts the encrypted satellite information and transmits it to the delayed correlation receiver. The delayed correlation receiver receives the encrypted satellite information using the standard SATPS antenna and performs the full correlation with the encrypted information received from the central station without requiring the secret encryption keys.

26 Claims, 14 Drawing Sheets

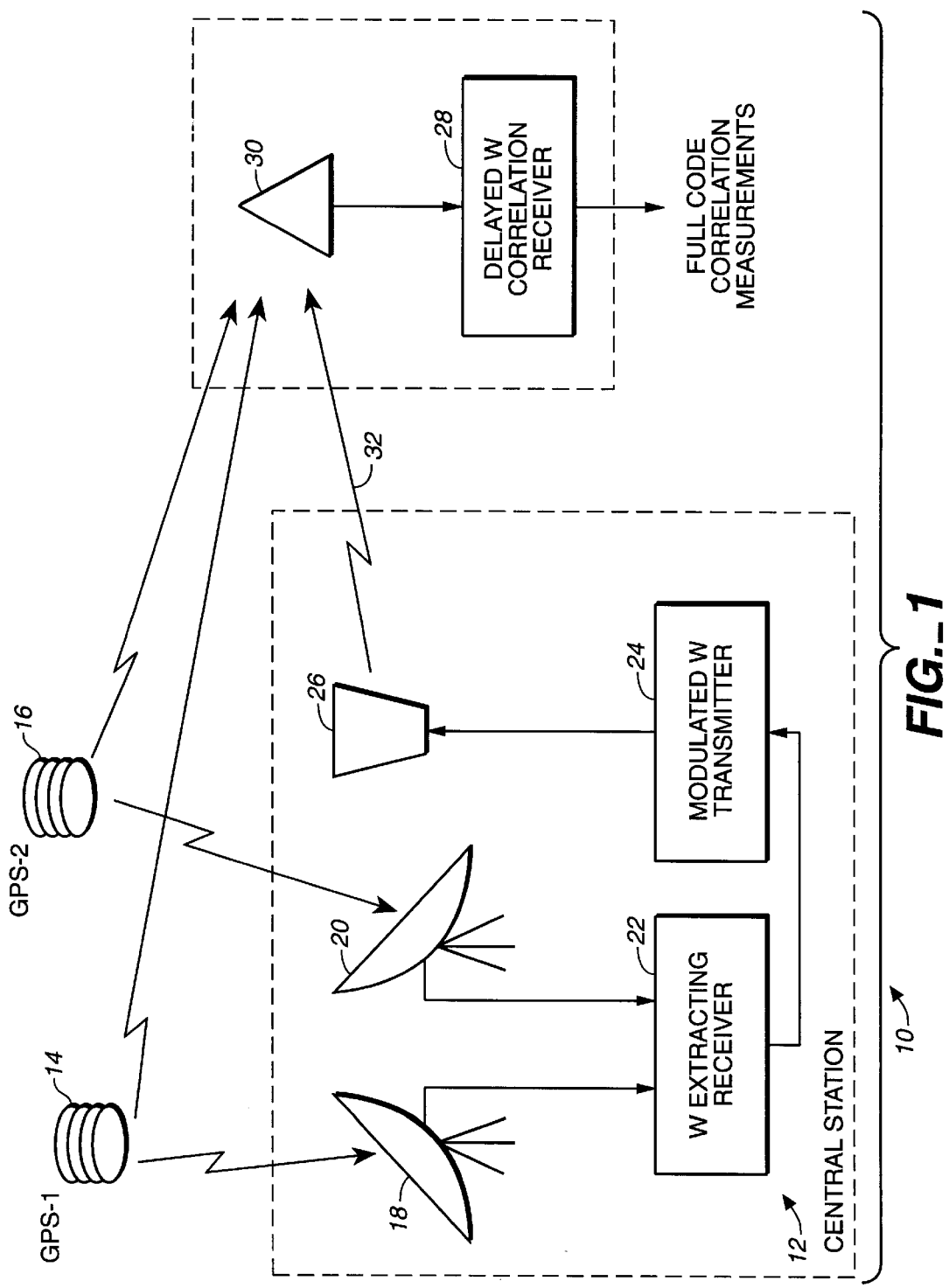
FIG._1

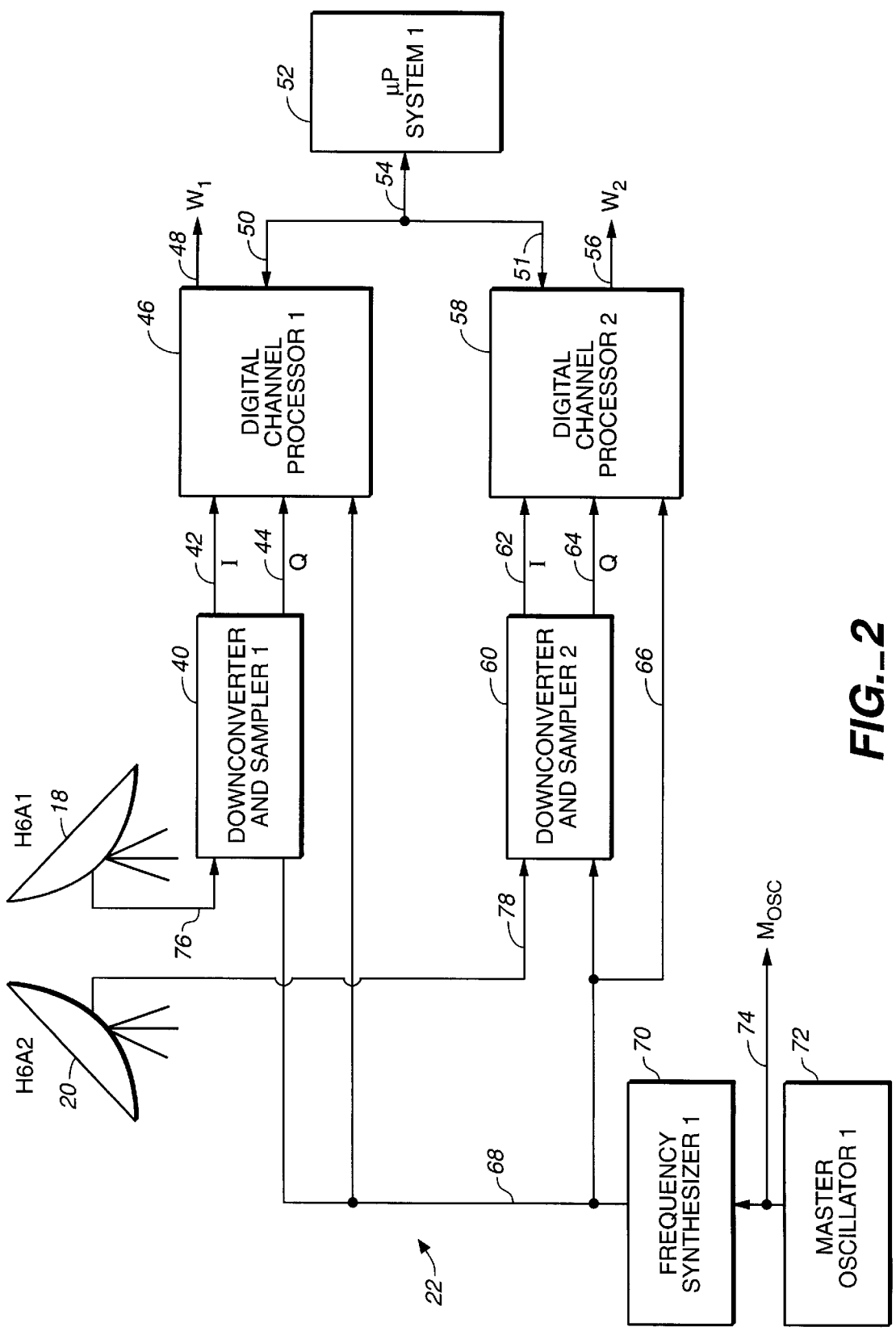
FIG._2

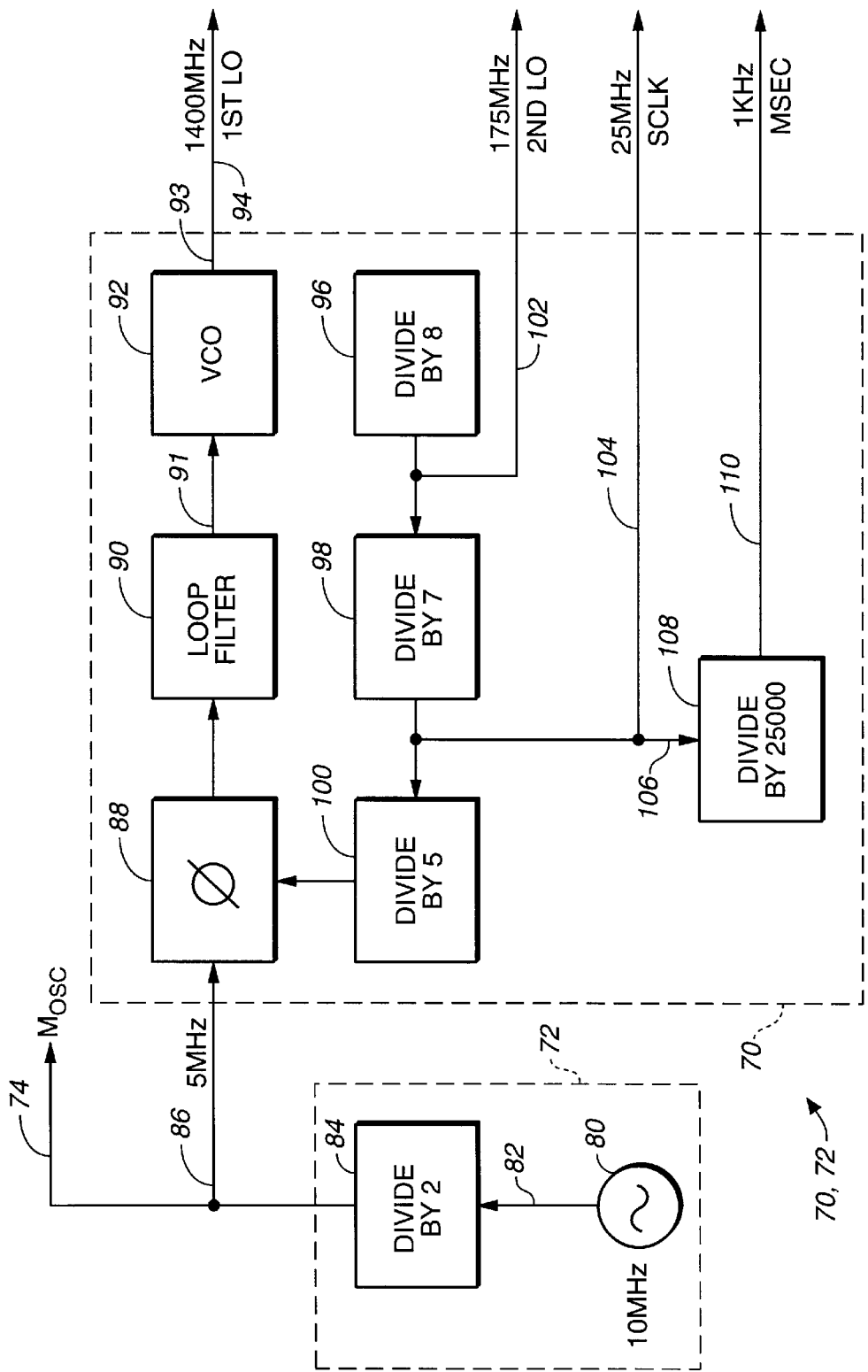
FIG._3

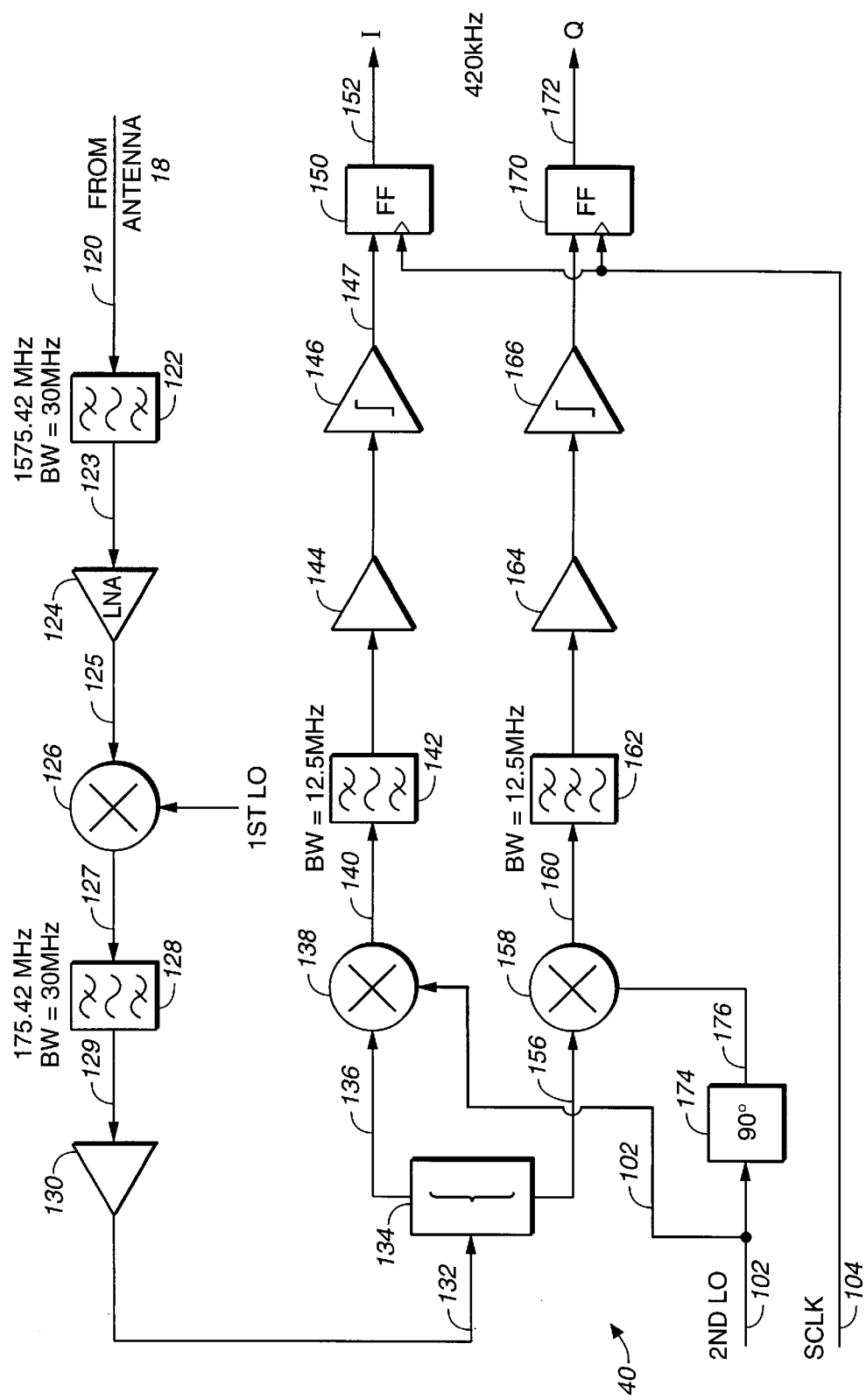
FIG._4

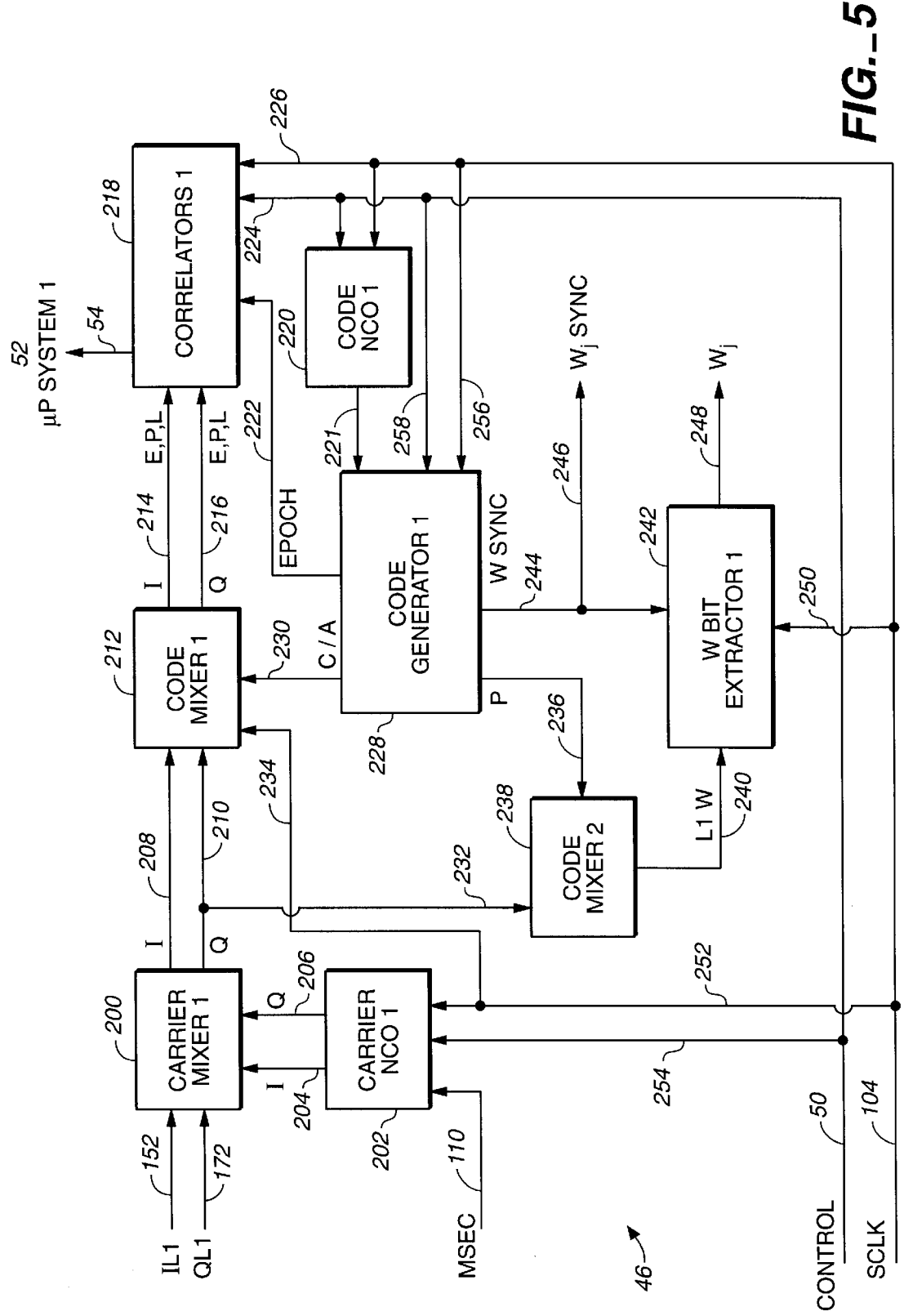
FIG._5

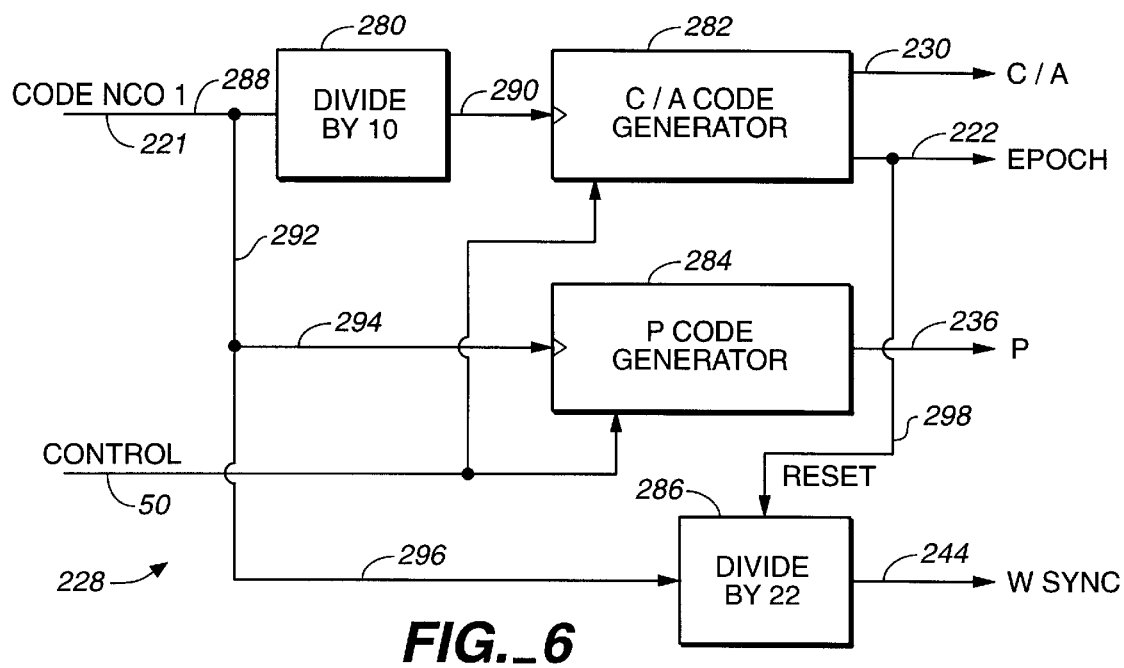
FIG._6
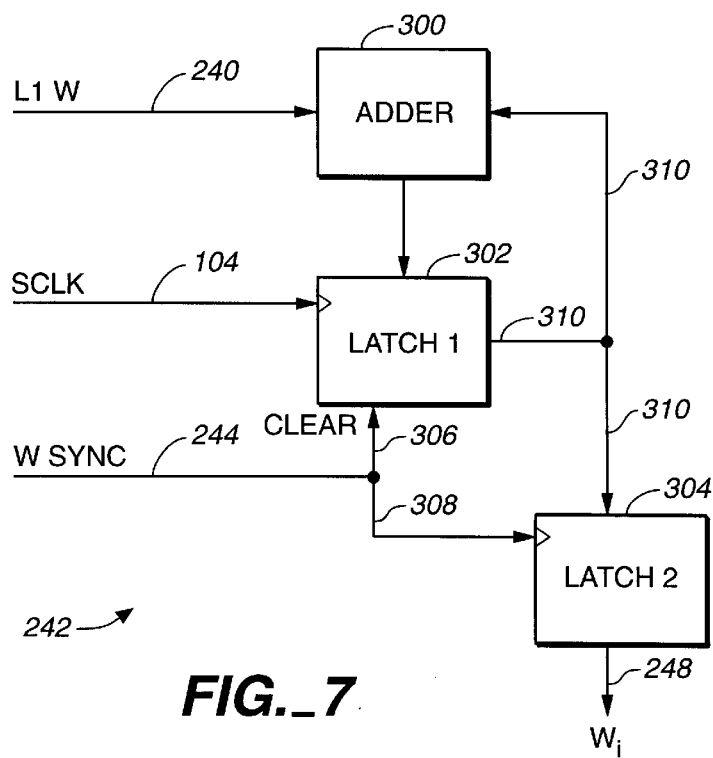
FIG._7

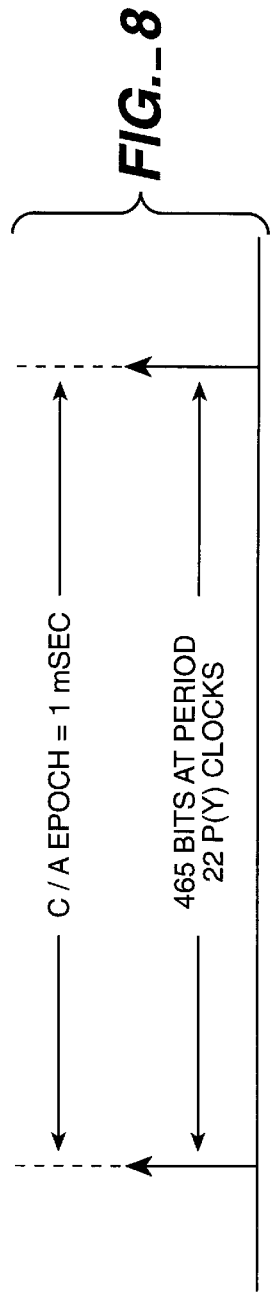
FIG._8
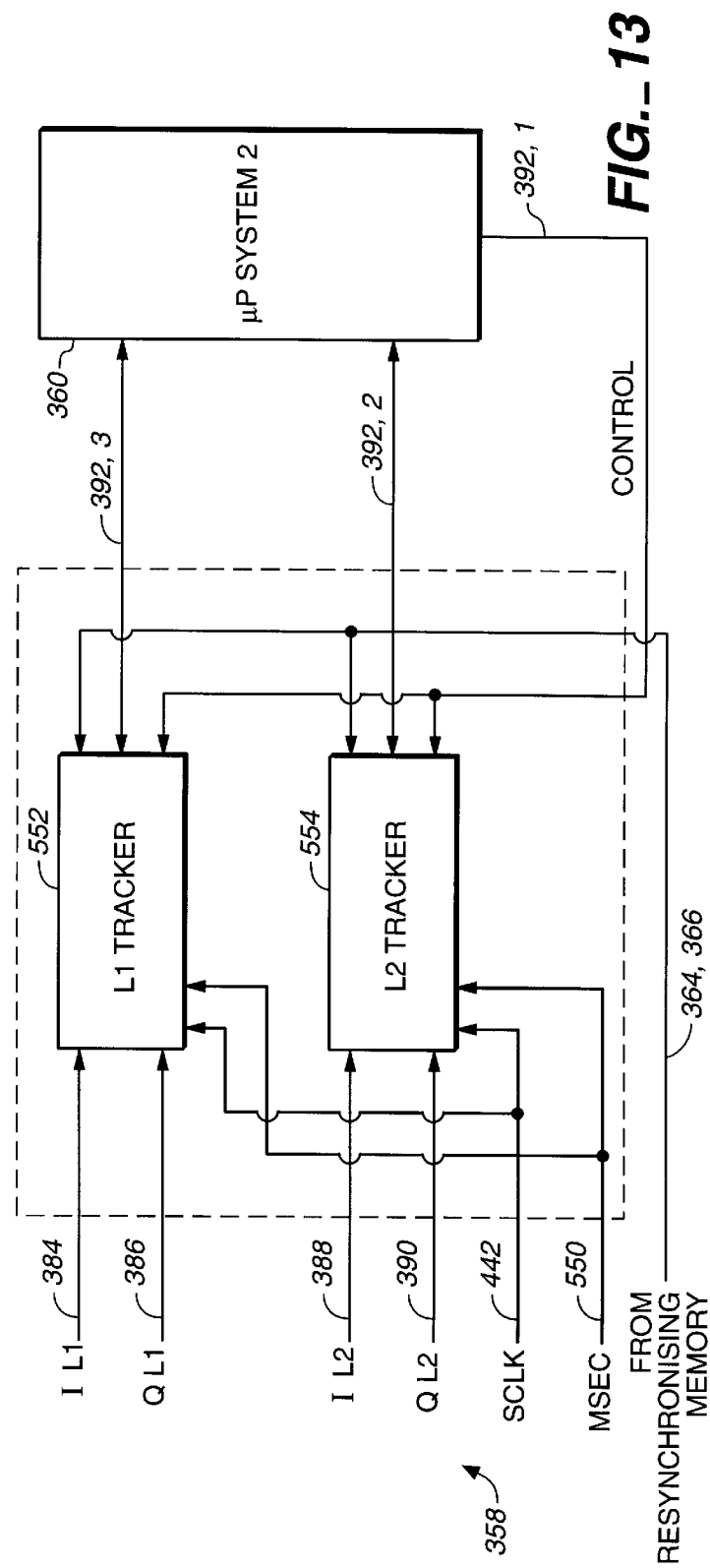
FIG._13

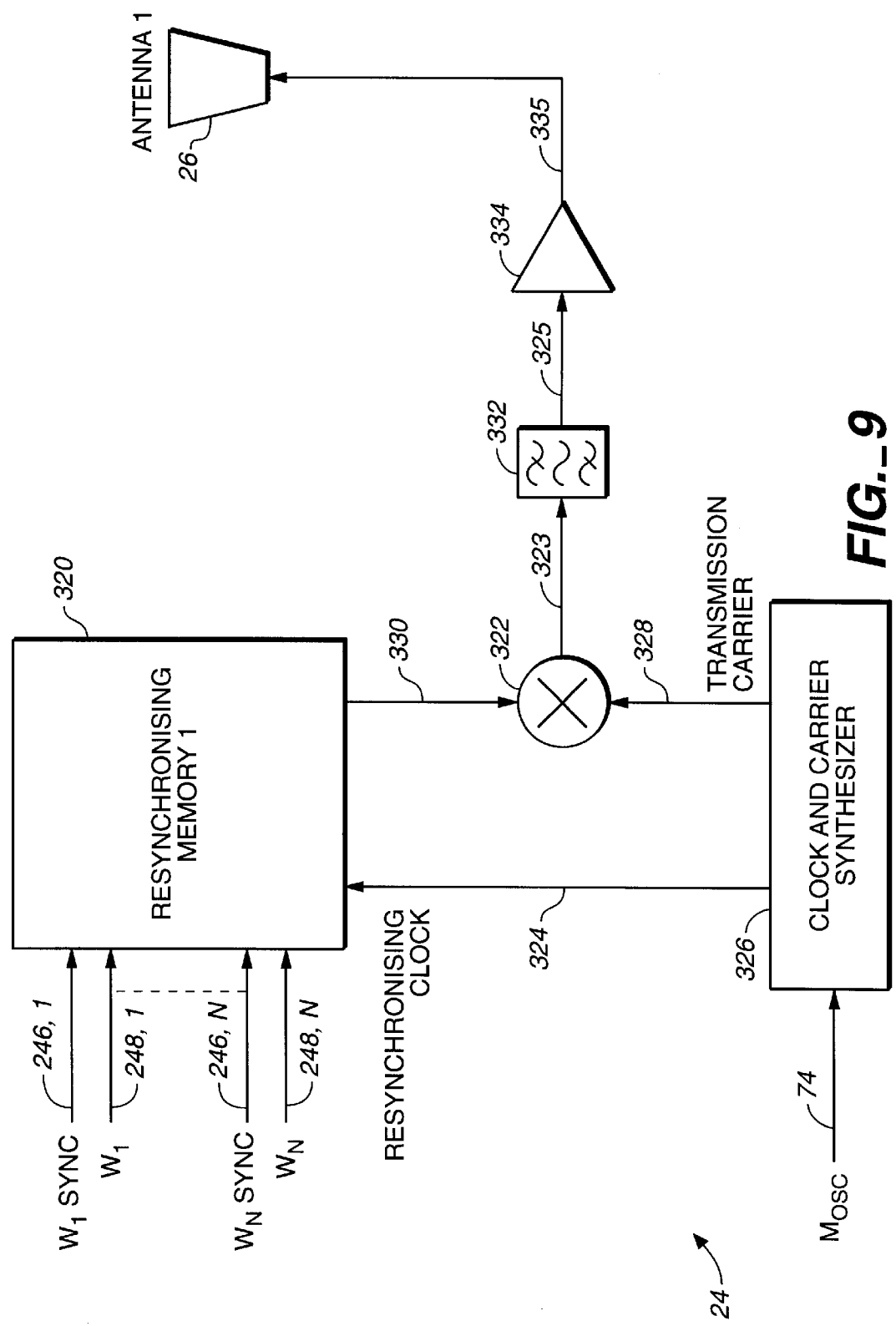
FIG._9

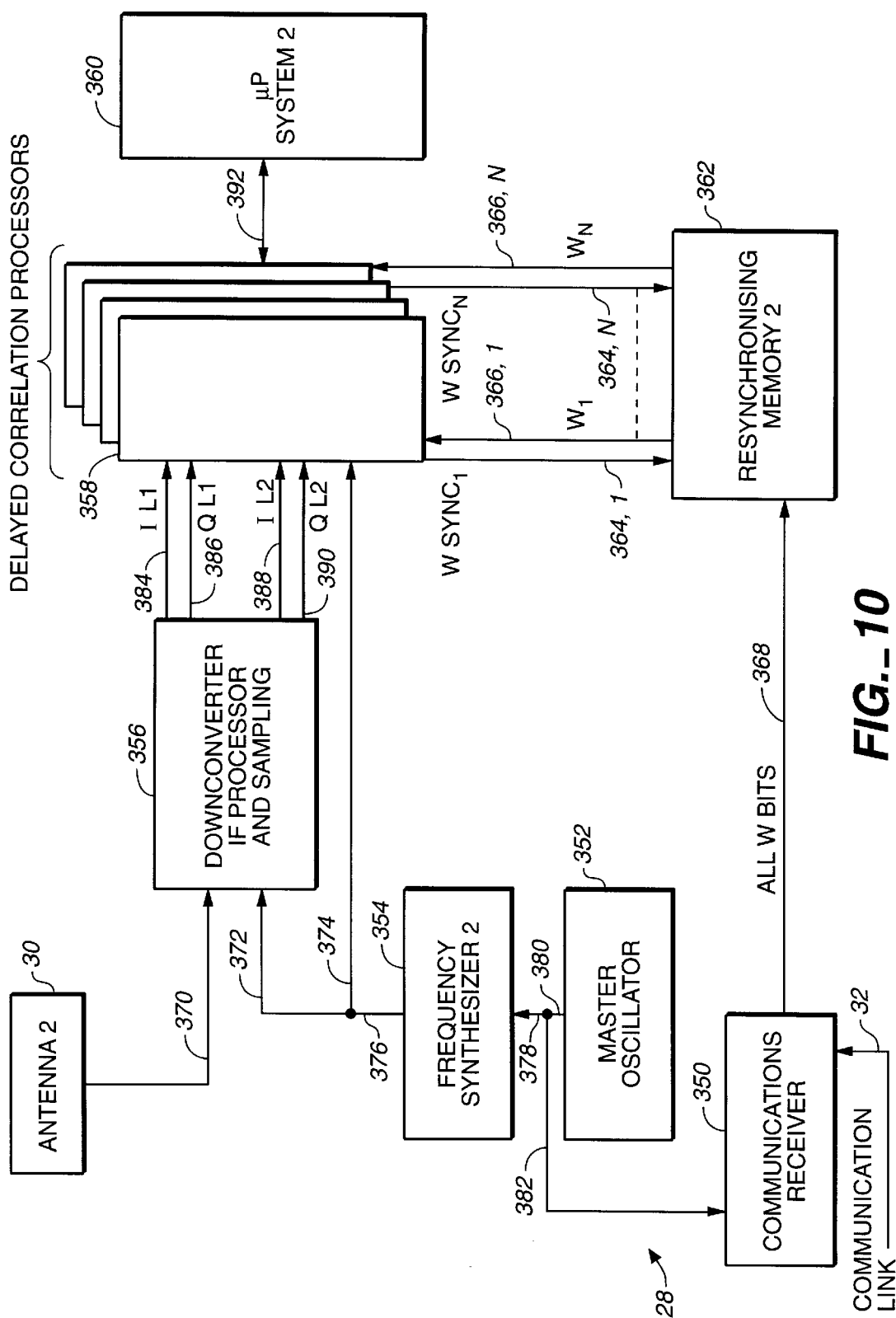
FIG._10

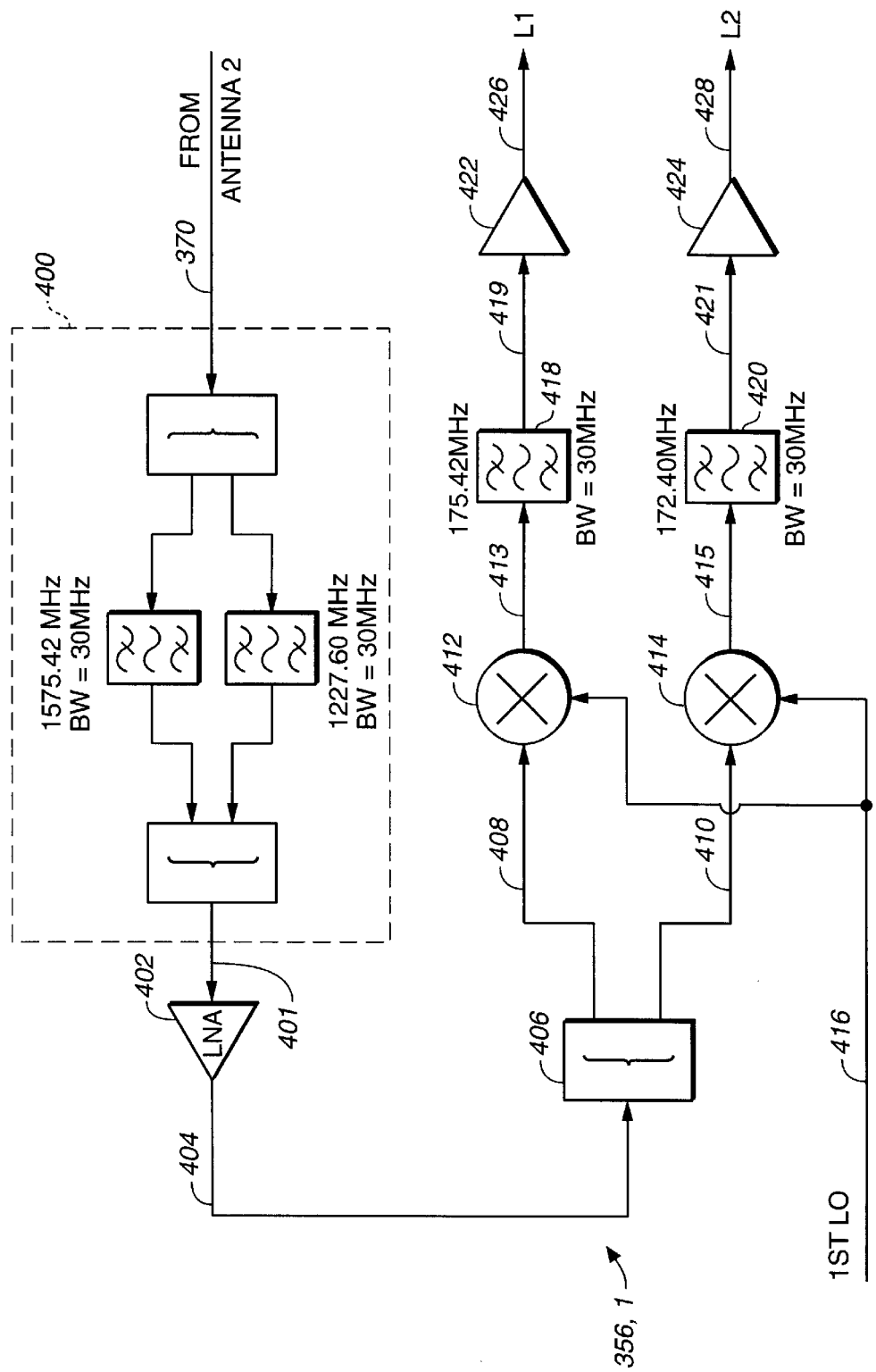
FIG._11

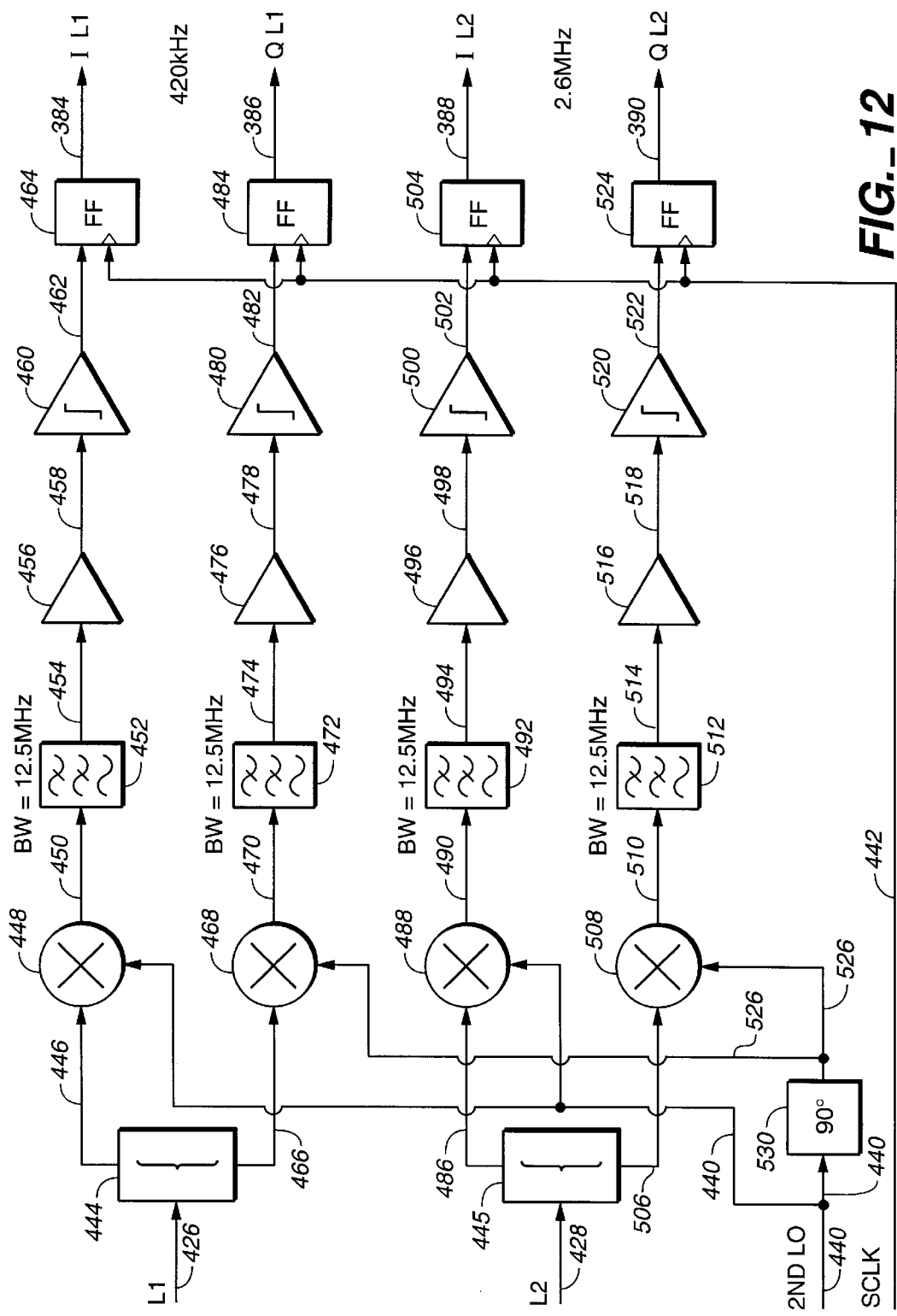
FIG._12

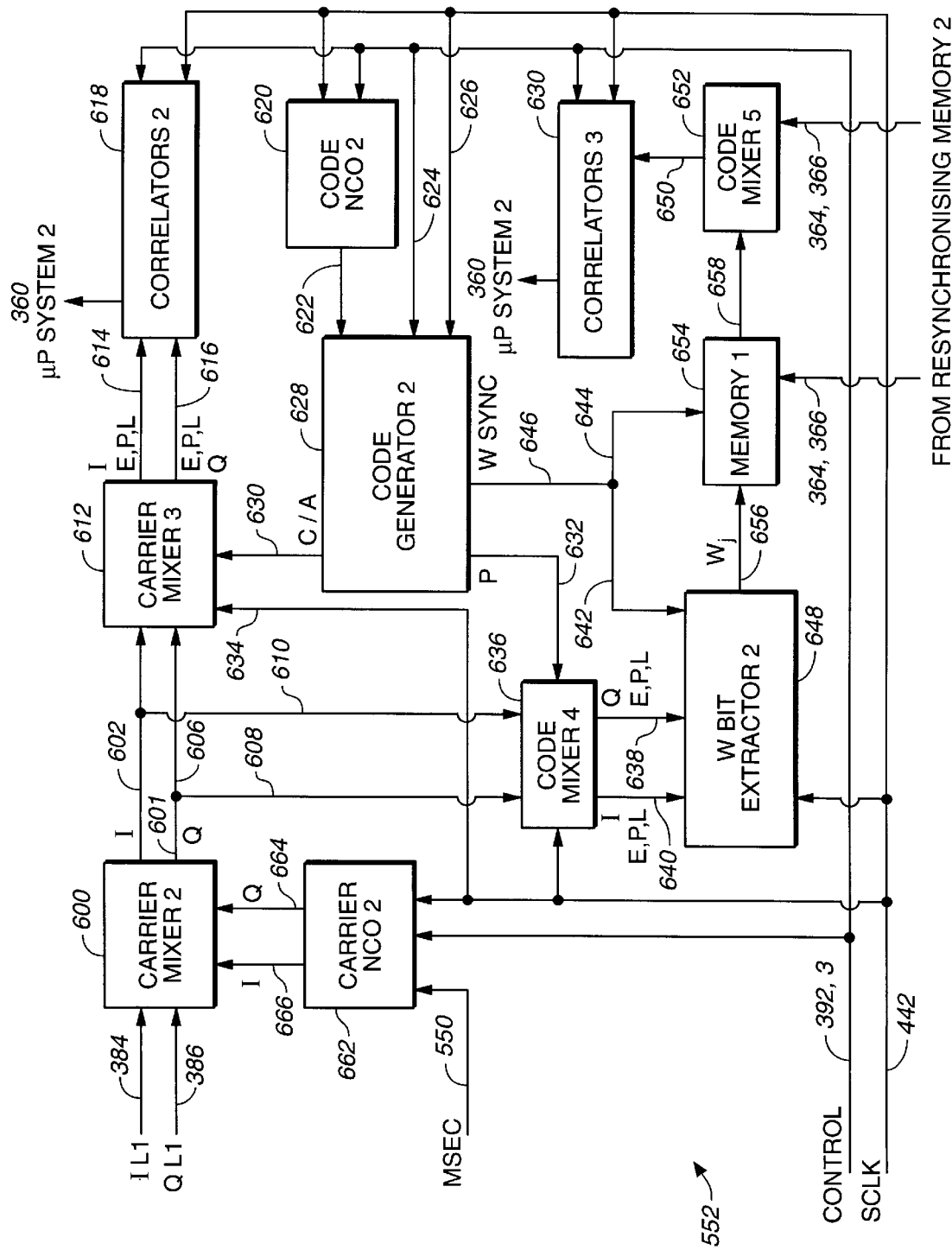
FIG._14

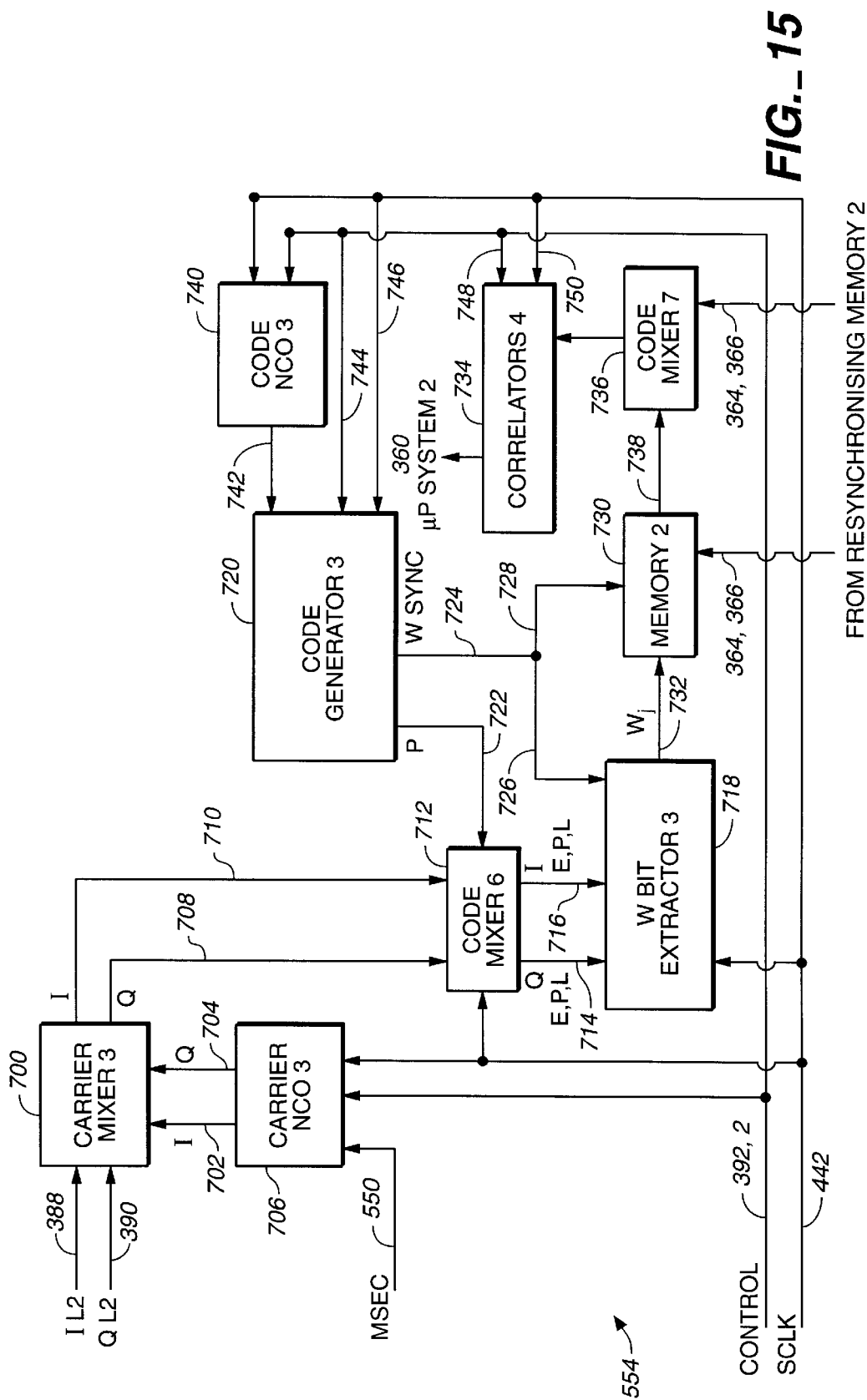
FIG._15

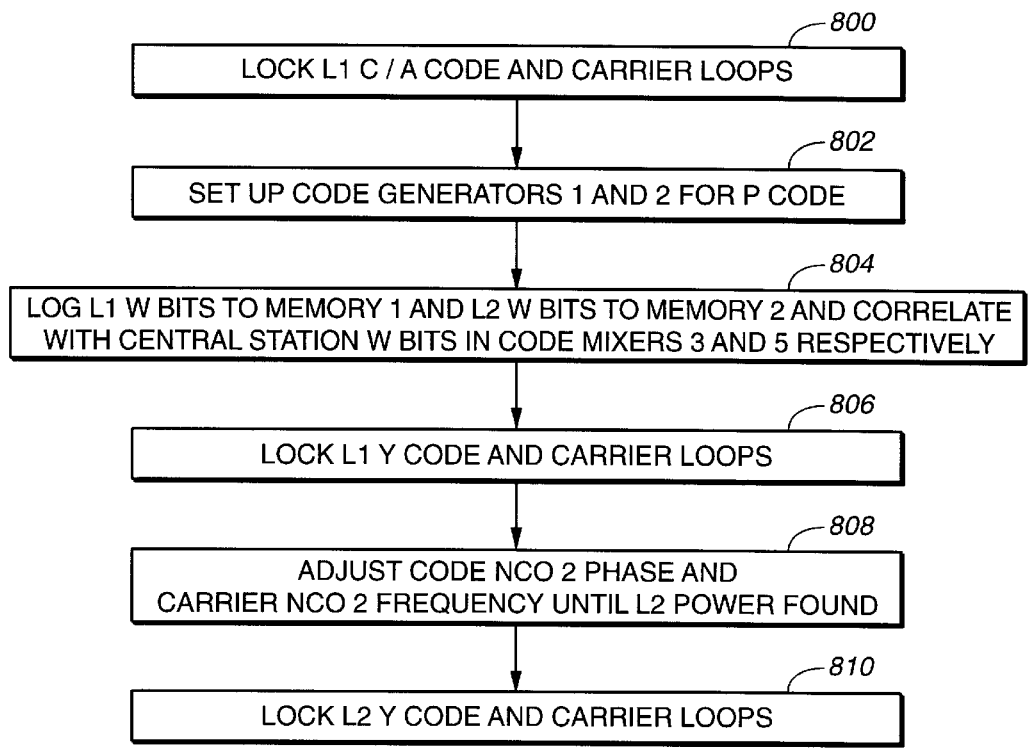
FIG._16
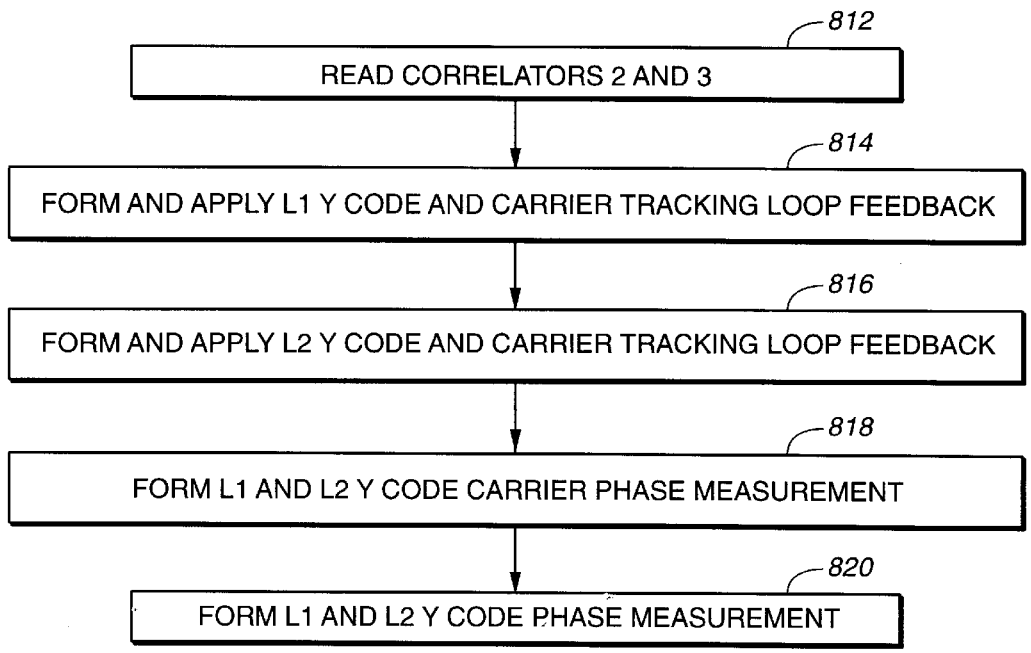
FIG._17

TRANSMITTING AND RECEIVING APPARATUS FOR FULL CODE CORRELATION OPERATION UNDER ENCRYPTION FOR SATELLITE POSITIONING SYSTEM

BACKGROUND

This invention relates to a transmitting and receiving apparatus for full code correlation operation under encryption for the Satellite Positioning System (SATPS). The SATPS includes different satellite systems. One of those systems is a Global Positioning System (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full PA-24 code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemerides of the transmitting GPS satellite (which includes complete information about the transmitting satellite within the next several hours of transmission) and an almanac for all GPS satellites (which includes less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=1,2, . . . 24) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is modulated only by the P-code. The GLONASS satellites transmit navigational data at a rate of 50 Baud for C/A code and 100 Baud for P code. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta$ti), wherein ($\Delta$ti) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range Ri to the satellite but only the pseudo-range (ri) to each SATPS satellite.

After the SATPS receiver determines the coordinates of the i-th SATPS satellite by picking up transmitted ephemerides constants, the SATPS receiver can obtain the solution of the set of the four equations for its unknown coordinates (x0, y0, z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SATPS receiver.

To prevent jamming signals from being accepted as actual satellite signals, the satellites are provided with a Y-code, which replaces the known P-code when the "anti-spoofing" (AS) is ON, wherein the Y-code is the modulo-two sum of an unknown W-code and the known P-code. When the AS is OFF, the Y-code is turned OFF, and the known P-code (see above the cited and incorporated by reference document ICD-GPS-200) is used. Thus, the secret Y-code can be turned ON or OFF at will by the U.S. Government. The AS feature allows the GPS system to be used for the military or other classified United States Government projects.

The C/A code is transmitted on L1 under all conditions as it is generally required to provide timing access to L1 and L2 P(Y) code. When AS is OFF, the known P code is transmitted on both L1 and L2, allowing authorized and unauthorized users alike access to full coded receiver operation on both L1 and L2 frequencies. As it is indicated above, when AS is ON, the known P code is replaced with a secret Y code on both L1 and L2. Since the Y-code is classified, the commercial GPS users employ different techniques to recover some of the characteristics of the Y-code.

One such technique is proposed by Counselman III in U.S. Pat. No. 4,667,203, wherein the incoming signal is divided into upper and lower sidebands, which are multiplied together to obtain the second harmonic of the carrier signal. However, the degradation of the signal-to-noise ratio (SNR) is the same as with squaring the entire signal.

U.S. Pat. No. 4,972,431 issued to Keegan, discloses a different approach to the recovering of the unknown Y-code. The incoming encrypted PA-24 code GPS signal is not immediately squared. Instead, after mixing with a local oscillator signal to lower its frequency to an intermediate frequency, the encrypted Y-code signal is correlated with a locally generated P-code signal. Since the locally generated P-code signal does not perfectly match the encrypted Y-code sequence, the correlation does not produce a sharp peak in the frequency spectrum. The result of the correlation is filtered by a bandpass filter, and the reduced-bandwidth signal is squared. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve carrier integer ambiguities.

In U.S. Pat. No. 5,293,170 issued to Lorenz, the modulated code period is estimated to be an integer multiple of P chips. The invention assumes the knowledge of the timing of the unknown Y-code. However, such Y-code timing information is not available to the commercial user and cannot be recovered without knowledge of the classified Y-code information.

In the existing prior art, unauthorized (and civilian) GPS users have been denied full access to the L2 signal and have been limited to full coded access of C/A code on L1. This results in subnormal signal-to-noise ratio (SNR). Full access to the L2 signal is particularly advantageous when attempting to perform accurate ionospheric measurements or corrections, and in real-time kinematic applications involving carrier cycle ambiguity searches.

What is needed is a system including a SATPS receiver capable of receiving L1/L2 signals in a substantially similar and optimal way, wherein the AS can be On, or OFF.

The present invention is unique because it discloses a method and apparatus for receiving L1/L2 signals in a substantially similar and optimal way, wherein the AS can be ON, or OFF, or change between these two states ON and OFF arbitrary. Several important characteristics of the observed Y-code are used for purposes of optimizing the GPS receiver design.

One aspect of the present invention is directed to a transmitting and receiving apparatus for full code correlation operation under encryption for the Satellite Positioning System (SATPS). The apparatus comprises a CENTRAL STATION for receiving encrypted satellite signals, for extracting the W bit information from the received encrypted signals; and for transmitting the extracted W bit information for each satellite being observed.

The apparatus also includes a DELAYED W CORRELATION RECEIVER that can perform full correlation on L1 and L2 encrypted signals without requiring the secret encryption keys.

The CENTRAL STATION further comprises: a W EXTRACTING RECEIVER for receiving encrypted satellite signals and for extracting the W bit information from the received encrypted signals; and a MODULATED W TRANSMITTER for transmitting die extracted W bit information for each satellite being observed by each DELAYED W CORRELATION RECEIVER.

The W EXTRACTING RECEIVER includes at least one HIGH GAIN ANTENNA (HGA) and a W BIT EXTRACTOR.

The use of the HIGH GAIN ANTENNA (HGA) significantly improves the signal-to-noise-ration (SNR) of the received satellite signals as compared with the use of the conventional GPS antenna.

The W BIT EXTRACTOR integrates the L1 W code signal across the W code bit period given by W SYNC signal, wherein the output of the W BIT EXTRACTOR provides an estimate $W_j$, '1' or '0', of the W code of the (j) satellite the DIGITAL CHANNEL PROCESSOR is locked to, j being an integer.

Another aspect of the present invention is directed to a method for performing the full correlation operation on the encrypted satellite signals generated by the Satellite Positioning System (SATPS).

The method comprises the steps of: (a) receiving encrypted satellite signals; (b) extracting the W bit information from the received encrypted signals; (c) transmitting the extracted W bit information for each satellite being observed; wherein the steps (a) through (c) are performed by a CENTRAL STATION; (d) receiving the encrypted L1 and L2 satellite code signals; (e) storing the observed samples of received encrypted satellite L1 and L2 satellite signals; (f) receiving extracted W bit information transmitted by the CENTRAL STATION; and (g) correlating the received encrypted L1 and L2 signals with the generated by the CENTRAL STATION W code for each observed satellite; wherein the steps (d) through (g) are performed by a DELAYED W CORRELATION RECEIVER.

BRIEF DESCRIPTION OF THE DRAWINGS

FIG. 1 illustrates a simplified block-diagram of the transmitting and receiving apparatus for full code correlation operation under encryption for the SATPS including a CENTRAL STATION and a DELAYED W CORRELATION RECEIVER.

FIG. 2 shows a W EXTRACTING RECEIVER.

FIG. 3 depicts a MASTER OSCILLATOR 1 and a FREQUENCY SYNTHESIZER 1 for generating a timing signal with a reference frequency 5 MHz, and for outputting a 1st LO1 (local oscillator) signal 1400 MHz, a second local oscillator (LO2) signal 175 MHz, and a (sampling clock) SCLK signal 25 MHz.

FIG. 4 is an illustration of a DOWNCONVERTER AND SAMPLER for generating digitized output samples IL1 and QL1 having carrier frequency 420 kHz.

FIG. 5 shows a DIGITAL CHANNEL PROCESSOR including a W BIT EXTRACTOR.

FIG. 6 depicts a CODE GENERATOR 1.

FIG. 7 illustrates a W BIT EXTRACTOR.

FIG. 8 is a depiction of a W code power analysis.

FIG. 9 is an illustration of a MODULATED W TRANSMITTER.

FIG. 10 shows a DELAYED W CORRELATION RECEIVER.

FIG. 11 depicts a DOWNCONVERTER.

FIG. 12 illustrates an IF PROCESSOR AND SAMPLING block.

FIG. 13 shows a DELAYED CORRELATION PROCESSOR.

FIG. 14 is a depiction of an L1 TRACKER.

FIG. 15 is an illustration of an L2 TRACKER.

FIG. 16 shows the steps of an acquisition process.

FIG. 17 is a depiction of the steps of a tracking process.

FULL DESCRIPTION OF THE PREFERRED EMBODIMENT

FIG. 1 illustrates the preferred embodiment of the present invention. The system 10 consists of a CENTRAL STATION 12 designed to receive the satellite signals from the GPS satellites GPS-1 (14) and the GPS-2 (16) ) using the HIGH GAIN ANTENNA (HGA) system 18 and 20. The HGA system receives the GPS satellite signals with a significantly improved signal-to noise ratio (SNR) as compared with a conventional GPS antenna that has gain of 3 dB. In one embodiment of the present invention each GPS satellite is tracked using a separate HGA.

The HGA can be implemented employing a parabolic dish antenna. The parabolic dish antennas suitable for the purposes of the present invention are produced by the Information Processing Systems, Inc., based in Belmont, Calif. The important characteristics of the parabolic antennas that can be utilized by the present invention (for observation frequency L1=1575.42 MHz) are given as follows: (a) antenna diameter=1.8 meters; (b) antenna gain=27 dB; (c) antenna beamwidth=7°.

The output of each HGA is fed into a W EXTRACTING RECEIVER 22. The purpose of the W EXTRACTING RECEIVER is to extract a W bit information from each satellite being observed. The extracted W bit streams are modulated and transmitted by the CENTRAL STATION 12 such that they can be received by at least one DELAYED W CORRELATION RECEIVER 28. The DELAYED W CORRELATION RECEIVER employs the conventional GPS antenna 30 capable of receiving the encrypted L1 and L2 code signals with the unknown W code from the satellites GPS-1 and the GPS-2. The DELAYED W CORRELATION RECEIVER stores the observed samples of the satellite signals in order to compare them with the generated by the CENTRAL STATION representation of the W bits. The CENTRAL STATION generates the representation of the W bits using the W EXTRACTING RECEIVER 22 and the MODULATED W TRANSMITTER 24, and transmits the W bit streams to the DELAYED W CORRELATION RECEIVER 28 using the COMMUNICATION LINK 32. The DELAYED W CORRELATION RECEIVER 28 correlates its own stored encrypted L1 and L2 signals with the generated by the CENTRAL STATION W code for each satellite being observed. Thus, the DELAYED W CORRELATION RECEIVER 28 can perform the full correlation of the L1 and L2 encrypted satellite signals without requiring the secret encryption keys.

The military purpose of the secret Y code is to prevent the authorized users from being spoofed (i.e. fooled) by unauthorized signals which attempt to mimic the satellite coding behavior. In order for such a spoofer to be effective, the spoofer must transmit the Y code signals in such a way that they arrive at the intended target around the same time as the real satellite generated signals arrive. The present invention does not facilitate the spoofing behavior. Indeed, the CEN- TRAL STATION relays W code bit information observed from the satellites with a time delay which makes it impossible to use this information for spoofing purposes.

The MODULATED W TRANSMITTER 24 shown in FIG. 1 uses the ANTENNA 1 26 and employs the COMMUNICATION LINK 32 in order to transmit the W bit streams to the DELAYED W CORRELATION RECEIVER 28. The information bandwidth of the COMMUNICATION LINK should be sufficient for the expected data rate for each satellite (465 bits/C/A epoch=465 kbits per second ) for optimal operation.

The COMMUNICATION LINK can comprise: (1) a radiowave frequency band; (2) an infrared frequency band; (3) a microwave frequency band; (4) the ISM (industrial scientific medical) unlicensed operation band, wherein the ISM band range is selected from a class of frequency range consisting of 900 MHz, 2.4 GHz, and 5.8 GHz; and wherein the user can own the both ends of the ISM communication system; (5) a real time circuit switched communication link; (6) a 1.8 GHz band, wherein the 1.8 GHz band supports the personal communications services (PCS); (7) a Low Earth Orbiting Satellites (LEOS), wherein the LEOS is used to store and to forward digital packet data; (8) a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal; (9) an Advanced Mobile Phone System (AMPS) including a modem, wherein the modem is selected from a class consisting of a DSP (digital signal processor) modem, and a cellular digital packet data (CDPD) modem; and (10) a digital cellular telephone communication means, wherein the digital cellular telephone communication means includes a means of modulation of digital data over a radiolink selected from a class consisting of a time division multiple access (TDMA) system, and a code division multiple access (CDMA) system.

It is also feasible that the U.S. Department of Defense (DOD) could make noiseless W bits available a short time after the satellite transmitted W code is received on the ground. This would allow the DELAYED W CORRELATION RECEIVER described in the present invention access to the full code correlation on L1 and L2 for civilian use, without affecting the anti-spoofing primary goal of Y code.

FIG. 2 depicts the preferred embodiment of the W EXTRACTING RECEIVER 22 of FIG. 1. The W EXTRACTING RECEIVER 22 of FIG. 2 employs at least one DOWNCONVERTER AND SAMPLER (40 and 60) and at least one DIGITAL CHANNEL PROCESSOR (46 and 58) for each GPS satellite being observed.

For the first satellite being observed (the first satellite channel) the DOWNCONVERTER AND SAMPLER 1 block 40 frequency translates, amplifies, and digitally samples the incoming L1 GPS signal 76, providing the I (42) and Q (44) output signals which are processed by the DIGITAL CHANNEL PROCESSOR 1 (46). A MASTER OSCILLATOR 1 (72) block is present to act as the frequency source for the reference system. A FREQUENCY SYNTHESIZER 1 block (70) uses the MASTER OSCILLATOR 1 output 74 to synthesize local oscillator and clock signals in the system. The MICROPROCESSOR SYSTEM 1 (52) ($\mu$P SYSTEM 1) provides the CONTROL signals 54 for the first satellite channel (50) and for the second satellite channel (51). FIG. 2 illustrates the two satellite channel system that is readily expandable to include more than two satellite channels.

FIG. 3 is a detailed representation of the MASTER OSCILLATOR 1 (see diagram 72 of FIG. 2) and the FREQUENCY SYNTHESIZER 1 (see diagram 70 of FIG. 2). In the preferred embodiment, the MASTER OSCILLATOR ((72) outputs the 5 MHz (86) signal that is obtained by dividing the 10 MHz signal 82 by 2 in the DIVIDE BY 2 block 84.

The FREQUENCY SYNTHESIZER 1 (70) takes as an input the 5 MHz signal 86 provided by the MASTER OSCILLATOR 1 (72) and outputs a first local oscillator (LO1) signal 94, a second local oscillator (LO2) signal 102, a SCLK signal 104, and a reference 1 KHz signal MSEC (110).

The 5 MHz signal 86 is compared with the 5 MHz signal output from a block "DIVIDE BY 5" (100) in a PHASE DETECTOR (88). The voltage output from the PHASE DETECTOR represents phase alignment of two 5 MHz signals and includes two signals, wherein the first of these signals has a large phase error and represents a large voltage output; and wherein the second of these signals has a small phase error and represents a small voltage output. A LOOP FILTER (90) filters out the high frequency voltage noise signal having a large phase error and outputs the low frequency noise signal 91 having a small phase error which is applied to a voltage controlled oscillator (VCO) 92. The low frequency noise signal 91 causes frequency change in the VCO output signal 93. When the loop is locked, the VCO output signal having a 1400 MHz frequency is used as the 1st LO1 (local oscillator) signal (94). By dividing the first local oscillator (LO1) signal by 8, a block 96 "DIVIDE BY 8" outputs the 2nd LO2 local oscillator signal 102 having 175 MHz. A block 98 "DIVIDE BY 7" divides the LO2 signal and outputs the sampling clock (SCLK) signal 104 having 25 MHz. A "DIVIDE BY 5" block 100 is used to close the LO1 loop. A DIVIDE BY 2500 (108) is used to obtain a 1 KHz MSEC reference signal (110).

FIG. 4 is an illustration of the preferred embodiment of the DOWNCONVERTER AND SAMPLER block (see for instance the first channel diagram 40 of FIG. 2). The function of this block was previously described in the U.S. Pat. No. 5,541,606, entitled "W CODE ENHANCED CROSS CORRELATION SATELLITE POSITIONING SYSTEM RECEIVER", that is incorporated herein by reference. However, in the present invention only the L1 W code extraction is required. Indeed, the W code is identical on L1 and L2. However, the L1 code is preferred to the L2 code because L1 code transmits 3 dB more Y code power than L2 does. Also, the extraction of W code is simplified for the L1 code because the ionospheric delay is not a factor when the tracking of the L1 C/A code is performed in order to extract L1 W code.

At first, the filtering and low noise amplification of the L1 is performed. Secondly, the L1 signal is mixed in frequency down to approximately 175 MHz. Lastly, the 175 MHz L1 signal is digitally sampled, and the L1 inphase (I) and quadrature (Q) signals at carrier frequencies 420 kHz are generated.

FIG. 4 shows the detailed preferred embodiment 40 of the DOWNCONVERTER AND SAMPLER block 40. The L1 signal 120 from the HGA 18 is bandpass filtered by the BANDPASS FILTER 122 with bandwidth BW=30 MHz. Filtered L1 signal 123 is fed into the low noise amplifier LNA 124. The noise figure of the LNA is 1.3 dB. The output signal 125 represents filtered and amplified L1 signal at 1575.42 MHz.

The L1 1575.42 MHz signal is mixed by the first local oscillator (LO1) 1400 MHz signal 94 (outputted by the FREQUENCY SYNTHESIZER 1 in FIG. 3) in the MIXER 126. The L1 signal 125 after mixing becomes an L1 signal 127 having 175.42 MHz frequency=(1575.42−1400) MHz which is bandpass filtered by the BANDPASS FILTER 128 having a bandwidth BW=30 MHz. This operation results in a L1 signal 129 having a BW=30 MHz. The AMPLIFIER 130 amplifies the L1 signal 129 and outputs the amplified L1 signal 132.

The POWERSPLITTER 134 splits the L1 signal 132 into two L1 signals 136 and 156. The inphase (I) version 102 of the second local oscillator (LO2) signal and generated by a block 90° (174) the quadrature (Q) version 176 of the second local oscillator (LO2) signal (175 MHz) are multiplied by the L1 signal in the MULTIPLIERs 138, and 158 to produce the inphase version IL1 (140) and the quadrature version QL1 (160) of the L1 signal at frequency 420 kHz=175.42 MHz−175 MHz and at 25 MHz sampling rate.

The IL1 signal 140 is lowpass filtered by a LOWPASS FILTER 142 with the BW=12.5 MHz (which satisfies the Nyquist Theorem for 25 MHz sampling rate of the IL1 signal), amplified by an AMPLIFIER 144, converted by an A/D CONVERTER 146, and sampled by clocking the input signal 147 through a 150 FLIP-FLOP 1 at sampling clock (SCLK) rate. The A/D conversion can be performed by using an L-bit quantization operation, L being an integer greater or equal to 1. If L=1, the 1-bit quantization is performed and the output signal IL1 (152) contains only the Most Significant Bit (MSB) of the IL1 signal at 420 KHz.

The QL1 signal (160) is similarly processed by a LOW-PASS FILTER 162, an AMPLIFIER 164, an A/D CONVERTER 166, and a FLIP-FLOP 2 (170), wherein the output (172) signal is a digitized QL1 signal at 420 KHz. Thus, the digital outputs of IF PROCESSOR block are the sampled versions of the L1 signal with carrier frequency of 420 KHz. The samples include all visible satellite carrier and code signals at respective frequencies.

FIG. 5 is a detailed representation of a DIGITAL CHANNEL PROCESSOR block 46 that processes the satellite information received from the first satellite channel of FIG. 2. One DIGITAL CHANNEL PROCESSOR block is required per satellite for W code extraction. FIG. 5 represents a typical DIGITAL CHANNEL PROCESSOR block that can be used for each satellite channel.

The DIGITAL CHANNEL PROCESSOR block is designed for tracking L1 C/A code when Y code is ON and L1 P code when Y code is OFF. The function of this block was previously described in the U.S. Pat. No. 5,541,606, entitled "W CODE ENHANCED CROSS CORRELATION SATELLITE POSITIONING SYSTEM RECEIVER", that is incorporated herein by reference.

The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The DIGITAL CHANNEL PROCESSOR can track the received GPS signals having very low signal levels by using a Delay-Lock Loop. The essential element of the Delay-Lock Loop is the block 218 CORRELATORS 1, wherein the received code is multiplied by a reference code having a time offset τ<T; T is a code chip interval. The code correlation is performed at 3 time points (E-early, P-punctual and L-late) on the autocorrelation function graph. The E, P, and L samples of the autocorrelation function are integrated in the block CORRELATOR 1. However, the CORRELATORs 1 output itself is not sufficient for code tracking because it does not provide an indication of the sign of the delay error of a tracking reference signal. Therefore, in the Delay-Lock Loop the L correlation signal is subtracted from the E correlation signal to form an (E−L) correlation signal. This correlation signal in the DIGITAL CHANNEL PROCESSOR becomes a number signal which is used to drive a numerically-controlled oscillator (the block 220 CODE NCO 1) or clock. This clock CODE NCO 1 (220) in turn drives the CODE GENERATOR 1 (228) in such a manner that if the clock is lagging in phase, the correction signal drives the clock faster and the reference code speeds up and runs in coincidence with the received signal. Thus, the reference code is tracking the received code. The EPOCH time ticks are then a measure of the received signal time. The DIGITAL CHANNEL PROCESSOR also includes a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than +1 code chip error. Initially the CENTRAL STATION may have little knowledge of its exact position and there may be a significant uncertainty as to the relative Doppler effect. With the C/A code there are a limited number, 1023, of code chips in the period; hence even with no initial knowledge of position relative to the satellite, one needs only to search a maximum of 1023 code chips. If acquisition of the C/A code of one satellite can be accomplished within acquisition time T, then the total acquisition time for N satellites can be NT if a single CENTRAL STATION is time sequenced over the N satellites.

Referring again to FIG. 5, the (202) block CARRIER NCO 1 has output inphase I signal 204 and quadrature Q signal 206 which are inphase and quadrature digital carrier at a rate which is phase locked to incoming signals via the µP SYSTEM 1 (52) control of its output frequency. The input sampled signals IL1 (152) and QL1 (172) (at carrier frequency 420 KHz) are sent to the CARRIER MIXER 1 (200) which uses the output signals I (204) and Q (206) from the CARRIER NCO 1 (202) to perform the frequency translation of the IL1 and QL1 signals from 420 KHz to baseband frequency. Thus, the carrier frequency is removed at this stage. The CARRIER NCO 1 block also performs the carrier phase measurements on the edge of MSEC signal 110. The output samples of the CARRIER MIXER 1 (I signal 208 and Q signal 210) and a locally generated by a CODE GENERATOR 1 (228) replica of C/A code 230 are fed to a 212 CODE MIXER 1 which performs the code correlation. The CODE GENERATOR 1 also generates the EPOCH clocking signal (222) that is used by the block CORRELATORS 1 for the correlation purposes.

When the carrier tracking loop is closed (via CARRIER NCO 1) the DIGITAL CHANNEL PROCESSOR is locked to the L1 C/A code satellite signal. Thus, the I input 208 to the 256 CODE MIXER 1 represents the satellite signal L1 C/A code, and the Q input 210 to the CODE MIXER 1 represents L1 Y code signal. The CODE MIXER I performs correlation of the L1 C/A code in I channel and L1 Y code in Q channel with a locally generated version of the C/A code. The result is the autocorrelated function of the C/A code in I channel 214 and noise in Q channel 216. The code correlation is performed at 3 time points (E-early, P-punctual and L-late) on the autocorrelation function graph. The E, P, and L samples of the autocorrelation function 214 and 216 are integrated in the block 218 CORRELATORS 1. The block CORRELATORS 1 is read by the $\mu$P SYSTEM 1 (52) at a rate of 1 KHz, which is the rate of the L1 C/A code epoch. (The L1 C/A code epoch is the rate at which C/A code repeats itself). The correlator values are used by the $\mu$P SYSTEM 1 (52) to develop feedback for the carrier tracking loop via CARRIER NCO 1 (200) and code tracking loop via CODE NCO 1 (220).

The CODE NCO 1 (220) provides the clock that drives the CODE GENERATOR 1 (228). The CODE NCO 1 also provides the mechanism by which the local code can be shifted into alignment with the incoming satellite code to achieve the code tracking loop lock.

When the DIGITAL CHANNEL PROCESSOR is locked to L1 C/A code, the Q output 210 of the CARRIER MIXER 1 represents an estimate of the L1 Y code which is fed to a CODE MIXER 2 (238). The CODE MIXER 2 (238) performs correlation of L1 Y code in Q channel (232) with a locally generated P code (236) and removes P code from the estimated L1 Y code by mixing it with a local replica of the known L1 P code. The output 240 of the CODE MIXER 2 represents an estimate of the L1 W code (240) having a bandwidth (BW) of 12.5 MHz. The W BIT EXTRACTOR (242) extracts the W bits (248) from the L1 W code signal (240) at the time marks generated by the W SYNC clocking signal (244) outputted by the CODE GENERATOR 1 (228).

FIG. 6 is an illustration of the CODE GENERATOR 1 228 of FIG. 5. The inputs to this block are the CODE NCO 1 output (221) and the CONTROL signal (50) generated by the $\mu$P SYSTEM 1 (52). The CODE NCO 1 signal is nominally at the P code rate (10.23 MHz) and is adjusted by the L1 C/A (or P) code tracking loop to maintain lock to the L1 signal. The C/A CODE GENERATOR 282 and the P CODE GENERATOR 284 are the standard shift register sequences described in the document "ICD-GPS-Z200" (infra) which is incorporated herein by reference. The C/A CODE GENERATOR produces signals C/A code (230) and EPOCH (222). The C/A code is the locally generated code and EPOCH is the repetition rate of the C/A code (1 kHz). The P CODE GENERATOR (284) produces the P code (236). Both C/A and P CODE GENERATORs can be adjusted under the CONTROL signal (50) produced by the $\mu$P SYSTEM 1 (52) to generate a particular satellite's C/A and P code for any channel (i). The CODE GENERATOR 1 block also generates a W SYNC clocking signal (244) by dividing the P code clock (10.23 MHz) by 22 in the DIVIDE BY 22 block (286) and by synchronizing to the C/A EPOCH signal. The W SYNC signal 244 acts as the satellite W code bit synchronizer for extracting the estimated W code bits.

FIG. 7 is a depiction of the W BIT EXTRACTOR 1 (242) of FIG. 5. The L1 W signal (240), which represents the samples of the L1 W code, is integrated across the W code bit period in the block W BIT EXTRACTOR 1 using the W SYNC clocking signal (244). The output of the W BIT EXTRACTOR provides an estimate '1' or '0' of the satellite's W code. The estimated W code bit has a high probability of being a correct bit because the CENTRAL STATION employs the HGA in order to receive the encrypted satellite signals. An ADDER 300 and a LATCH 1 302 form an ACCUMULATOR that accumulates across the W bit period W SYNC. The accumulated signal is transferred to the output $W_i$ (248) by clocking LATCH 2 (304) on the W SYNC signal.

The output of the DIGITAL CHANNEL PROCESSOR is the W code bit, integrated across 22 P(Y) clocks, from the satellite being tracked. As long as the actual W code clocking rate is not constantly 90° out of phase with W SYNC, the W BIT EXTRACTOR is able to extract energy from the satellite being tracked.

FIG. 8 illustrates the power analysis of the W code. According to the power analysis, the W code has a dominant clock frequency at 22 P(Y) chips, aligned with the C/A code EPOCH. It follows, that an 'integrate and dump' circuit (realized in the W BIT EXTRACTOR) synchronized to the C/A EPOCH and running at a rate of 22 P(Y) chips will provide the optimal estimation of W code bits even though the actual W code rate remains unknown.

FIG. 9 shows the preferred embodiment of the MODULATED W TRANSMITTER block 24 of FIG. 1. In this block the W code bit estimates are clocked into the RESYNCHRONISING MEMORY 1 block 320 at a rate of W SYNC for each satellite being observed. The purpose of the RESYNCHRONISING MEMORY 1 block 320 is to allow the W bits to be formatted and clocked at a different rate, a rate conducive to effective transmission rate. The resynchronising clock rate (324) is provided by the CLOCK AND CARRIER SYNTHESIZER (326). The reformatted W bits 330 are mixed with the transmission carrier 328 in the MIXER 322, filtered in the FILTER 332, amplified in the AMPLIFIER 334, and transmitted to the DELAYED W CORRELATION RECEIVER (block 28 of FIG. 1) using the ANTENNA 1 block 26.

The RESYNCHRONISING MEMORY 1 block 320 can also be used to add a time tag to the transmission such that the DELAYED W CORRELATION RECEIVER can know which GPS millisecond each W code section belongs to, thus allowing alignment with its observed W code. The time tagging is not necessary if the transmission time is fixed and known, although a time tag would be advantageous for direct Y code acquisition (without having to lock to L1 C/A code first).

FIG. 10 depicts an embodiment of the DELAYED W CORRELATION RECEIVER 28 of FIG. 1. The GPS satellites are received via the ANTENNA 2 block 30 (see also FIG. 1), that is a typical 3 dB gain, dual patch L1/L2 GPS antenna. It can be implemented by using a magnetically mountable model 21423-00 commercially available from Trimble Navigation of Sunnyvale, Calif. The signal 370 is then frequency translated, amplified, filtered, and sampled in the DOWNCONVERTER, IF PROCESSOR AND SAMPLING block 356. The IL1 (384), QL1 (386), IL2 (388), and QL2 (390) outputs of the DOWNCONVERTER AND IF PROCESSOR AND SAMPLING block are digitally processed in the multiple DELAYED CORRELATION PROCESSORS (358), one per satellite tracked. The W code bits logged by the W EXTRACTING RECEIVER 22, formatted by the MODULATED W TRANSMITTER 24, and transmitted using the COMMUNICATION LINK 32 are received by the COMMUNICATIONS RECEIVER 350. The logged and formatted W bits are reformatted in the RESYNCHRONISING MEMORY 2 block 362 back to conform to the standard W bits. The standard $W_1$ bits 364,1 (corresponding to the first satellite channel) through the $W_N$ bits 364,N (corresponding to the N satellite channel) and the clocking signals for the first channel W $SYNC_1$ 366,1 through the clocking signal for the N channel W $SYNC_N$ 366, N enter the DELAYED CORRELATION PROCESSORS 1 through N. The DELAYED CORRELATION PROCESSORS perform correlation of its own observed encrypted satellite W code signals with the processed by the CENTRAL STATION W code for each observed satellite under the control of the µP SYSTEM 2 (360).

The FREQUENCY OSCILLATOR 2 block 354 and the MASTER OSCILLATOR 2 block 352 provide the clocking signals. The detailed embodiments of these two blocks are the same as the embodiments of the FREQUENCY OSCILLATOR 1 block 70 and the MASTER OSCILLATOR 1 block 72 that were disclosed above.

FIG. 11 and FIG. 12 show the DOWNCONVERTER AND IF PROCESSOR AND SAMPLING block 356 of FIG. 10. This block has been previously described in the U.S. Pat. No. 5,541,606, entitled "W CODE ENHANCED CROSS CORRELATION SATELLITE POSITIONING SYSTEM RECEIVER, that is incorporated herein by reference.

The DOWNCONVERTER 356,1 depicted in FIG. 11 decreases the frequency of the L1/L2 signal 401 outputted by the FILTER block 400. The L1/L2 signal 404 after the LNA block 402 is split in a POWER SPLITTER 406 into two signals L1 signal 408 and L2 signal 410. The L1 and L2 signals are mixed separately by the first local oscillator (LO1) 1400 MHz signal 416 (outputted by the FREQUENCY SYNTHESIZER 2 block 354 of FIG. 10) in the MIXERs 412 and 414. After mixing, the L1 signal (413) becomes an L1 signal 419 signal having 175.42 MHz frequency=(1575.42−1400) MHz which is bandpass filtered by the BANDPASS FILTER 418 having a bandwidth BW=30 MHz. This operation results in a L1 signal having a BW=30 MHz. Similarly, the L2 signal after being mixed in the BANDPASS FILTER 420 with BW=30 MHz becomes an L2 signal 421 having 172.40 MHz frequency and BW=30 MHz. The AMPLIFIERs 422 and 424 respectively amplify the L1 signal 419 and L2 signal 421 and output L1 signal 426 and L2 signal 428.

FIG. 12 describes an IF (intermediate frequency) PROCESSOR AND SAMPLING block 356,2 of FIG. 10 which has as input signals the L1 (175.42 MHZ) signal 426 and the L2 (172.4 MHz) signal 428 outputted by the DOWNCONVERTER 356. (See FIG. 11). The IF PROCESSOR AND SAMPLING block also uses the second local oscillator (LO2) signal 440 and the SCLK signal 442 outputted by the FREQUENCY SYNTHESIZER 2 block 354 (see FIG. 10) as its timing signals. The POWERSPLITTERs 444 and 445 split the L1 and the L2 signals into two L1 and L2 signals respectively. The inphase (I) version 440 and generated by a 530 block 90° the quadrature (Q) version 526 of the 2nd LO2 signal (175 MHz) are multiplied by the L1 signal in the MULTIPLIERs 448, and 468 to produce the inphase version IL1 and the quadrature version QL1 of the L1 signal at frequency 420 KHz=175.42 MHz−175 MHz and at 25 MHz sampling rate. Similarly, the inphase IL2 and the quadrature QL2 versions of the L2 signal at frequency 2.6 MHz=(175 MHz−172.4 MHz) and at 25 MHz sampling rate are generated in the MULTIPLIERS 488 and 508.

The IL1 signal is lowpass filtered by a LOWPASS FILTER 452 with the BW=12.5 MHZ which satisfies the Nyquist Theorem for 25 MHz sampling rate of the IL1 signal, amplified by an AMPLIFIER 456, converted by an A/D CONVERTER 460, and sampled by clocking the input signal 462 through a 464 FLIP-FLOP 1 at sampling clock (SCLK) rate. The A/D conversion can be performed by using an L-bit quantization operation, L is an integer greater or equal to 1. If L=1, the 1-bit quantization is performed and the output signal 164 contains only the Most Significant Bit (MSB) of the IL1 signal at 420 KHz.

The QL1 signal is similarly processed by a LOWPASS FILTER 472, an AMPLIFIER 426, an A/D CONVERTER 480, and a FLIP-FLOP 2 (484), wherein the output 386 signal is a digitized QL1 signal at 420 KHz.

The L2 signal is processed by LOWPASS FILTERs (492 and 512), AMPLIFIERs (496 and 516), A/D CONVERTERs (500 and 520), and FLIP-FLOPs 3 and 4 (504 and 524) respectively to produce an inphase version IL2 (388) and a quadrature version QL2 (390) of the output signal at 2.6 MHz. Thus, the digital outputs of IF PROCESSOR AND SAMPLING block are the sampled versions of GPS signal with carrier frequencies of 420 KHz and 2.6 MHz respectively. The samples include all visible satellite carrier and code signals at the respective frequencies.

FIG. 13 depicts the DELAYED CORRELATION PROCESSOR block 358 of FIG. 10 which has the same representation for each satellite channel. The DELAYED CORRELATION PROCESSOR is further divided into two blocks, L1 TRACKER (552) and L2 TRACKER (554). The L1 TRACKER is designed to perform delayed correlation on the L1 Y code signal. The L2 TRACKER is designed to operate on the L2 Y code.

FIG. 14 is the preferred embodiment of the L1 TRACKER of FIG. 13. The sampled L1 signals (IL1 384 and QL1 386) are frequency translated to 0 Hz using the CARRIER NCO 2 block (662) and the CARRIER MIXER 2 block (600). The CODE MIXER 3 (612) and the CORRELATORS 2 (618) facilitate tracking the L1 C/A code signal. When locked to the L1 C/A code signal timing information is extracted such that the CODE GENERATOR 2 (628) including the CODE GENERATOR P code can be preloaded to the correct time of week. When tracking the L1 C/A code, the I output (602) of the CARRIER MIXER 2 contains a maximum of L1 C/A code signal power and the Q output (604) contains a maximum of L1 Y code signal power. The I and Q outputs of CARRIER MIXER 2 are mixed with the locally generated P code in the CODE MIXER 4 (636), producing the E (early), P (punctual), and L (late) comparisons with the locally generated P code. The I and Q definitions become Q and I for Y code. The output of CODE MIXER 4 still contains the unknown W code. The output of CODE MIXER 4 is integrated across the period 22 P(Y) clocks by the W BIT EXTRACTOR 2 (648). The result of these integrations is stored in the block MEMORY 1 (654). When the equivalent timing CONTROL STATION estimated W code bits arrive from the RESYNCHRONISING MEMORY 2 they are mixed with the locally generated L1 W code estimates in the CODE MIXER 5 block (652). The output signal from the CODE MIXER 5 660 is then correlated in the CORRELATORS 3 (650), wherein the block CORRELATORS 3 is read by the µP SYSTEM 2 (360) periodically to allow tracking of the L1 Y signal code and carrier tracking loops via CODE NCO 2 (620) and CARRIER NCO 2 (662) respectively.

The L1 acquisition process involves locking to the L1 C/A code signal first. Once the locally generated P code has been set up using timing information from the L1 C/A code tracking loop, the code and carrier tracking loops which were formed from the L1 C/A signal can be formed from the L1 Y code signal. Further use of L1 Y code tracking is useful in mitigating multipath effects (as Y code has a narrower chip width than C/A code) and in jamming environments. The technique also provides an anti-spoofing benefit as long as the COMMUNICATION LINK from the CENTRAL STATION is secured.

The biggest benefit of the delayed W code correlation technique is to be found when tracking the L2 Y code signal. When encrypted, L1 still transmits the C/A code and thus measurements may be made with this signal. On the other hand, when encrypted, the L2 signal only provides L2 Y code.

FIG. 15 shows details of the L2 TRACKER 554 of FIG. 13. The sampled L2 signal (IL2 388 and QL2 390) is frequency translated to 0 Hz using the CARRIER MIXER 3 (700) and CARRIER NCO 3 (706). The CODE MIXER 6 (712) mixes the incoming I (710) and Q (708) samples with a locally generated P code (722). The E, P, and L outputs of the CODE MIXER 6 are integrated across the period 22 P(Y) clocks in the W BIT EXTRACTOR 3 (718). The output of the W BIT EXTRACTOR 3 is stored in the MEMORY 2 (730). When the equivalent timing CONTROL STATION estimated W code bits arrive from the RESYNCHRONISING MEMORY 2 they are mixed with the locally generated L1 W code estimates in the CODE MIXER 7 (736). The output of the CODE MIXER 7 is then correlated in the CORRELATORS 4 (734), wherein the CORRELATORS 4 is read by the $\mu$P SYSTEM 2 (360) periodically to allow tracking of the L2 Y signal code and carrier tracking loops via CODE NCO 3 (740) and CARRIER NCO 3 (706) respectively.

FIG. 16 and FIG. 17 describe the software ACQUISITION and TRACKING modes. These modes of operation have been previously described in the U.S. Pat. No. 5,541,606, entitled "W CODE ENHANCED CROSS CORRELATION SATELLITE POSITIONING SYSTEM RECEIVER", that is incorporated herein by reference.

In the ACQUISITION mode, the L1 C/A code is locked in the code and carrier tracking loops (step 800). The step (802) is the set up of the CODE GENERATORs 1 and 2 for generation of the local P code. The following step (804) is the initiation of the logging process of L1 W bits into MEMORY 1 and L2 W bits into MEMORY 2 and performing the correlation process with the transmitted from the CENTRAL STATION W bits in CODE MIXERs 5 and 7 respectively. After that, the L1 Y code and carrier loops are locked (step 806), the CODE NCO 2 phase and CARRIER NCO 2 frequency are adjusted until L2 power is found (step 808), and the L2 Y code and carrier loops are locked (step 810). Thus, the acquisition mode is completed.

The TRACKING mode follows the acquisition of the satellite signals. At first, the CORRELATORS 2 and 3 are read (step 812). Secondly, the L1 Y and L2 Y code and carrier tracking loop feedbacks are formed and applied (step 814 and step 816). This allows to perform the L1 and L2 Y code carrier phase measurements (step 818) and the L1 ad L2 code phase measurements (step 820). This completes the tracking mode of operation.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A transmitting and receiving apparatus for full code correlation operation under encryption for a Satellite Positioning System (SATPS); wherein a Y code replaces a known P-code when the anti spoofing (AS) is ON; and wherein said Y-code is the modulo-two sum of an unknown W-code and said known P-code; said apparatus comprising:

a CENTRAL STATION further comprising:
   a W EXTRACTING RECEIVER further comprising:
      at least one HIGH GAIN ANTENNA (HGA) for receiving the satellite signals from at least one SATPS satellite;
      at least one DOWNCONVERTER AND SAMPLER for frequency translating, amplifying and digitally sampling the incoming L1 signals, wherein a first DOWNCONVERTER AND SAMPLER 1 is connected to a first HGA (1), wherein a second DOWNCONVERTER AND SAMPLER is connected to a second HGA (2), wherein an i-th DOWNCONVERTER AND SAMPLER is connected to an i-th HGA(i); and wherein an N-th DOWNCONVERTER AND SAMPLER is connected to an N-th HGA (N); i being an integer less or equal to N, N being a number of satellites being observed;
      at least one DIGITAL CHANNEL PROCESSOR for further processing the digitally sampled satellite L1 signals, wherein a first DIGITAL CHANNEL PROCESSOR 1 is connected to a first DOWNCONVERTER AND SAMPLER 1, wherein a second DIGITAL CHANNEL PROCESSOR 2 is connected to a second DOWNCONVERTER AND SAMPLER 2, wherein an i-th DIGITAL CHANNEL PROCESSOR is connected to an i-th DOWNCONVERTER AND SAMPLER; and wherein an N-th DIGITAL CHANNEL PROCESSOR is connected to an N-th DOWNCONVERTER AND SAMPLER;
      a MASTER OSCILLATOR 1 block for providing the frequency source for the reference system;
      a FREQUENCY SYNTHESIZER 1 block connected to said MASTER OSCILLATOR 1 block, wherein said FREQUENCY SYNTHESIZER 1 block uses said MASTER OSCILLATOR 1 block output signal for synthesizing local oscillator and clock signals; and
      a MICROPROCESSOR SYSTEM 1 ($\mu$P SYSTEM 1) connected to each said DIGITAL CHANNEL PROCESSOR for providing a CONTROL signal for each said DIGITAL CHANNEL PROCESSOR; and
   a MODULATED W TRANSMITTER connected to said W EXTRACTING RECEIVER for resynchronizing, delaying, and combining the extracted W code for each said satellite being observed; and for transmitting said combined, delayed and resynchronized W code;

a DELAYED W CORRELATION RECEIVER: (a) for receiving the real time encrypted L1 and L2 satellite code signals; (b) for storing the observed samples of received encrypted satellite L1 and L2 satellite signals; (c) for receiving said extracted resynchronized, delayed and combined W bit information transmitted by said CENTRAL STATION; (d) and for correlating its own observed encrypted L1 and L2 signals with the corresponding portions of said extracted resynchronized, delayed and combined W bit information; and a COMMUNICATION LINK connecting said DELAYED W CORRELATION RECEIVER and said CENTRAL STATION;

wherein said DELAYED W CORRELATION RECEIVER can perform full correlation on L1 and L2 encrypted signals without requiring secret encryption keys.

2. The apparatus of claim 1, wherein said MODULATED W TRANSMITTER further comprises:

a RESYNCHRONIZING MEMORY 1 block, wherein each said i-th W code bit estimate is clocked into said RESYNCHRONIZING MEMORY 1 at the rate of said i-th W SYNC signal, i being an integer less or equal to N, wherein N is a number of satellites being observed, and wherein said RESYNCHRONIZING MEMORY 1 block generates an intermediate W code signal;

a CLOCK AND CARRIER SYNTHESIZER block connected to said RESYNCHRONIZING MEMORY 1 block for generating a resynchronizing clock, wherein said resynchronizing clock is used for formatting and clocking said intermediate W code bits at a different rate, and for adding a time tag to the transmission signal so that said DELAYED W CORRELATION RECEIVER can identify which GPS millisecond each reformatted W code section belongs to;

a MULTIPLIER for mixing said reformatted W code bits with a transmission carrier signal generated by said CLOCK AND CARRIER SYNTHESIZER block;

a BANDWIDTH FILTER AND AMPLIFIER connected to said MULTIPLIER for generating an output combined W code signal; and an ANTENNA 1 connected to said BANDWIDTH FILTER AND AMPLIFIER for transmitting said combined output W code signal to said DELAYED W CORRELATION RECEIVER via said COMMUNICATION LINK.

3. The apparatus of claim 1, wherein said COMMUNICATION LINK further comprises: a radiowave frequency band.

4. The apparatus of claim 1, wherein said COMMUNICATION LINK includes an infrared frequency band.

5. The apparatus of claim 1, wherein said COMMUNICATION LINK includes a microwave frequency band.

6. The apparatus of claim 1, wherein said COMMUNICATION LINK includes the ISM (industrial scientific medical) unlicensed operation band, and wherein the ISM band range is selected from a class of frequency range consisting of 900 MHz, 2.4 GHz, and 5.8 GHz.

7. The apparatus of claim 1, wherein said COMMUNICATION LINK includes a real time circuit switched communication link.

8. The apparatus of claim 1, wherein said COMMUNICATION LINK includes a 1.8 GHz band, wherein said 1.8 GHz band supports a personal communications services (PCS).

9. The apparatus of claim 1, wherein said COMMUNICATION LINK includes a Low Earth Orbiting Satellites (LEOS), wherein said LEOS is used to store and to forward digital packet data.

10. The apparatus of claim 1, wherein said COMMUNICATION LINK is selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal.

11. The apparatus of claim 1, wherein said COMMUNICATION LINK includes an Advanced Mobile Phone System (AMPS) including a modem, and wherein said modem is selected from a class consisting of a digital signal processor (DSP) modem, and a cellular digital packet data (CDPD) modem.

12. The apparatus of claim 1, wherein said COMMUNICATION LINK includes a digital cellular telephone communication means, and wherein said digital cellular telephone communication means includes a means of modulation of digital data over a radiolink selected from a class consisting of a time division multiple access (TDMA) system, and a code division multiple access (CDMA) system.

13. The apparatus of claim 1, wherein said i-th DOWNCONVERTER AND SAMPLER further comprises:

an i-th BANDPASS FILTER connected to said i-th HGA for filtering an i-th L1 signal generated by an i-th satellite;

an i-th LOW NOISE AMPLIFIER (LNA) connected to said i-th BANDPASS FILTER for amplifying said filtered i-th L1 signal;

an i-th MULTIPLIER connected to said i-th LOW NOISE FILTER for multiplying said i-th L1 signal with a first local oscillator signal, LO1, wherein an i-th mixed signal is produced;

an i-th BANDPASS FILTER connected to said i-th MULTIPLIER for filtering said i-th mixed signal;

an i-th AMPLIFIER connected to said i-th BANDPASS FILTER for amplifying said i-th filtered signal, wherein said i-th L1 signal is downconverted from the 1575.42 MHz frequency to a frequency of 175.42 MHz;

an i-th POWER SPLITTER connected to said i-th AMPLIFIER for power splitting said i-th L1 signal into two signals;

a first i-th MULTIPLIER for multiplying said i-th L1 signal with an inphase (I) version of a second local oscillator signal, LO2, to produce an i-th IL1 signal;

a second i-th MULTIPLIER for multiplying said i-th L1 signal with a quadrature (Q) version of said second local oscillator signal, LO2, to produce an i-th QL1 signal;

a first i-th LOWPASS FILTER connected to said first i-th MULTIPLIER for filtering said first i-th mixed signal;

a second i-th LOWPASS FILTER connected to said second i-th MULTIPLIER for filtering said second i-th mixed signal;

a first i-th AMPLIFIER connected to said first i-th LOWPASS FILTER for amplifying said i-th IL1 signal;

a second i-th AMPLIFIER connected to said second i-th LOWPASS FILTER for amplifying said i-th QL1 signal;

a first i-th one-bit analog-to-digital (A/D) CONVERTER connected to said first i-th AMPLIFIER for performing 1-bit quantization operation on said i-th IL1 signal;

a second i-th one-bit analog-to-digital (A/D) CONVERTER connected to said second i-th AMPLIFIER for performing 1-bit quantization operation on said i-th QL1 signal;

a first i-th FLIP-FLOP (FF1) connected to said first i-th one-bit A/D CONVERTER for sampling said i-th IL1 signal, wherein said sampling operation is performed by clocking said i-th IL1 signal through said i-th FF1 at sampling clock (SCLK) rate; and a second i-th FLIP-FLOP (FF2) connected to said second i-th one-bit A/D CONVERTER for sampling said i-th QL1 signal, wherein said sampling operation is performed by clocking said i-th QL1 signal through said i-th FF2 at sampling clock (SCLK) rate.

14. The apparatus of claim 1, wherein said MASTER OSCILLATOR 1 block further includes:
   a 10 MHz GENERATOR for generating a 10 MHz signal; and
   a DIVIDE BY 2 block coupled to said 10 MHz GENERATOR block for dividing by 2 the 10 MHz signal generated by said 10 MHz GENERATOR block.

15. The apparatus of claim 1, wherein said FREQUENCY SYNTHESIZER 1 further comprises:
   a PHASE DETECTOR for comparing phases of two signals, first said signal being an output signal from said MASTER OSCILLATOR 1 block, second said signal being generated by said FREQUENCY SYNTHESIZER 1 local reference signal, wherein minimum voltage output signal from said PHASE DETECTOR represents maximum phase alignment of said two signals;
   a LOOP FILTER connected to said PHASE DETECTOR for filtering out high frequency voltage noise, wherein an output LOOP FILTER voltage signal includes a low frequency voltage noise;
   a VOLTAGE CONTROLLED OSCILLATOR (VCO) connected to said LOOP FILTER, wherein a voltage signal at the input of said VCO causes frequency change in said VCO output signal, and wherein said VCO nominal output signal is locked to said reference signal; and wherein said VCO nominal output signal is used as a first local oscillator signal, LO1;
   a first DIVIDER connected to said VCO to divide said VCO output signal to obtain a second local oscillator signal, LO2;
   a second DIVIDER connected to said first DIVIDER to divide said second oscillator signal, LO2, to obtain a sampling clock signal, SCLK; and
   a third DIVIDER connected to said second DIVIDER to divide said sampling clock SCLK signal to obtain a MSEC reference signal.

16. The apparatus of claim 1, wherein said FREQUENCY SYNTHESIZER 1 further comprises:
   a "Divide by 5" block;
   a PHASE DETECTOR connected to said block "Divide by 5" for comparing 5 MHz output signal from said MASTER OSCILLATOR 1 with 5 MHz signal from said "Divide by 5" block, wherein minimum voltage output signal from said PHASE DETECTOR represents maximum phase alignment of two said 5 MHz signals;
   a LOOP FILTER connected to said PHASE DETECTOR for filtering out high frequency voltage noise;
   a VOLTAGE CONTROLLED OSCILLATOR (VCO) connected to said LOOP FILTER, wherein voltage signal at the input of said VCO causes frequency change in said VCO output signal, and wherein said VCO nominal output 1400 MHz signal is locked to said 5 MHz reference signal; and wherein said 1400 MHz VCO output signal is used as a 1st local oscillator (LO1);
   a "Divide by 8" block connected to said VCO to divide said 1400 MHz VCO output signal by 8 to obtain a 175 MHz signal used as a second local oscillator, LO2;
   a "Divide by 7" block connected to said "Divide by 8" block to divide said 175 MHz signal by 7 to obtain a 25 MHz signal used as a sampling clock signal (SCLK); and
   a "Divide by 25000" block connected to said "Divide by 7" block for dividing said sampling clock signal SCLK to obtain a 1 kHz reference signal, MSEC.

17. The apparatus of claim 1, wherein said i-th DIGITAL CHANNEL PROCESSOR further comprises:
   an i-th carrier numerically controlled oscillator (CARRIER NCO 1);
   an i-th CARRIER MIXER 1 connected to said i-th CARRIER NCO 1 for multiplying i-th digitized inphase IL1 and i-th digitized inphase QL1 signals having carrier frequency with i-th inphase and i-th quadrature components of digital carrier; wherein said i-th CARRIER MIXER 1 outputs i-th inphase IL1 and i-th quadrature Q L1 signals having zero carrier frequency;
   an i-th CODE MIXER 1 connected to said i-th CARRIER MIXER 1 for code correlating said i-th inphase IL1 and said i-th quadrature Q L1 signals having zero carrier frequency with a locally generated replica of C/A code; wherein when said i-th DIGITAL CHANNEL PROCESSOR's carrier tracking loop is closed via said i-th CARRIER NCO 1 the i-th CARRIER MIXER 1's input to said i-th CODE MIXER 1 represents an i-th satellite signal L1 C/A code; and wherein said i-th CODE MIXER 1 performs said code correlation at 3 time points (early, punctual and late) on an i-th autocorrelation function graph creating an early, a punctual and a late sample of said i-th autocorrelation function;
   an i-th block CORRELATORS 1 connected to said i-th CODE MIXER 1 for integrating said early, punctual and late samples of said i-th autocorrelation function over an integer number of i-th EPOCH signals; wherein said i-th CORRELATORS 1 output signal is fed to said $\mu$P SYSTEM 1 at a rate of said i-th L1 C/A code EPOCH, and wherein said $\mu$P SYSTEM 1 uses said i-th CORRELATORS 1 output signal to develop feedback signals for an i-th L1 carrier tracking loop and for an i-th L1 code tracking loop;
   an i-th CODE GENERATOR 1 connected to said i-th CORRELATORS 1 block for providing an i-th locally generated replica of C/A code, an i-th locally generated replica of P code, said i-th EPOCH signal, and an i-th W SYNC signal;
   an i-th code numerically controlled oscillator (an i-th CODE NCO 1) connected to said i-th block CORRELATORS 1 and connected to said i-th CODE GENERATOR 1 for driving said i-th CODE GENERATOR 1;
   an i-th CODE MIXER 2 connected to said i-th CODE GENERATOR 1 for removing said i-th locally generated P code from said i-th incoming satellite Y code and for outputting an i-th L1 W code signal; and
   an i-th W BIT EXTRACTOR 1 connected to said i-th CODE MIXER 2 and connected to said i-th CODE GENERATOR 1 for integrating said i-th L1 W code signal across an i-th W code bit period given by said i-th W SYNC signal, wherein the output of said i-th W BIT EXTRACTOR 1 provides an estimate $W_i$, '1' or '0', of said i-th W code.

18. The apparatus of claim 17, wherein said i-th CODE GENERATOR 1 further comprises:
   a first i-th DIVIDING CIRCUIT for dividing an input signal from said i-th CODE NCO to provide an i-th clock signal;

an i-th C/A CODE GENERATOR connected to said first i-th DIVIDING CIRCUIT for generating said i-th C/A code signal and said i-th EPOCH signal under said CONTROL signal of said μP SYSTEM 1, wherein said i-th C/A code signal is a locally generated i-th C/A code, and wherein an i-th EPOCH 1 signal is the repetition rate of said i-th C/A code, and wherein said i-th C/A CODE GENERATOR can be adjusted under said CONTROL signal to generate said i-th C/A code;

an i-th P CODE GENERATOR connected to said i-th CODE NCO 1, wherein said i-th P CODE GENERATOR is clocked by said i-th CODE NCO 1 signal under the CONTROL signal of said μP SYSTEM 1, and wherein said i-th P CODE GENERATOR generates said i-th P-code signal; and an i-th DIVIDE BY 22 block connected to said i-th P CODE GENERATOR for dividing said i-th P code clock by 22, for synchronizing to said i-th C/A code EPOCH signal, and for outputting said i-th W SYNC signal; wherein said i-th W SYNC signal acts as the i-th satellite W code bit synchronizer for extracting estimated i-th W code bits.

19. The apparatus of claim 17, wherein said i-th W BIT EXTRACTOR 1 further comprises:

an i-th ADDER;

a first i-th LATCH 1 connected to said i-th ADDER for accumulating the i-th L1 W signal across said i-th W bit period i-th W SYNC and for generating $W_i$ bits; and a second i-th LATCH 2 connected to said first i-th LATCH 1 for transferring to the output said $W_i$ bits by clocking said i-th LATCH 2 at the rate of said i-th W SYNC signal.

20. The apparatus of claim 1, wherein said DELAYED W CORRELATION RECEIVER further comprises:

an ANTENNA 2 block for receiving real time L1 and L2 satellite signals from all N satellites being observed;

a DOWNCONVERTER AND IF PROCESSOR AND SAMPLING BLOCK connected to said ANTENNA 2 for frequency translating, amplifying, filtering, and sampling said received real time L1/L2 satellite signals;

at least one DELAYED CORRELATION PROCESSOR connected to said DOWNCONVERTER AND IF PROCESSOR AND SAMPLING BLOCK, a COMMUNICATIONS RECEIVER for receiving said combined delayed output W signal transmitted from said MODULATED W TRANSMITTER via said COMMUNICATION LINK;

a RESYNCHRONIZING MEMORY 2 connected to said COMMUNICATIONS RECEIVER, wherein said RESYNCHRONIZING MEMORY 2 is configured to split said combined delayed output W signal into N delayed signals ($W_1; W_2; \ldots W_i \ldots W_N$) and into N synchronizing signals (W $SYNC_1$; W $SYNC_2$; ... W $SYNC_i$; ... W $SYNC_N$);

a μP SYSTEM 2 connected to each said DELAYED CORRELATION PROCESSOR for providing the CONTROL signal;

a FREQUENCY SYNTHESIZER 2 connected to each said DELAYED CORRELATED PROCESSOR; and a MASTER OSCILLATOR 2 connected to said FREQUENCY SYNTHESIZER 2;

wherein said FREQUENCY SYNTHESIZER 2 and said MASTER OSCILLATOR 2 blocks supply the necessary clocking signals;

and wherein each said i-th DELAYED CORRELATION PROCESSOR is configured to correlate said real time signals i-th IL1 and i-th IL2 from said i-th satellite with said delayed signal $W_i$ from said i-th satellite at said W $SYNC_i$ rate.

21. The apparatus of claim 20, wherein said DOWNCONVERTER AND IF PROCESSOR AND SAMPLING BLOCK further comprises a DOWNCONVERTER block comprising:

a POWER SPLITTER 1 connected to said ANTENNA 2 for power splitting a single L1/L2 signal received by said ANTENNA 2 into two separate L1 and L2 signals;

a pair of two separate BANDPASS FILTER connected to said POWER SPLITTER 1 for filtering said L1 and L2 signals independently;

a POWER COMBINER connected to said pair of two separate BANDPASS FILTER for power combining said L1 and L2 signals into one combined signal L1/L2;

a LOW NOISE AMPLIFIER (LNA) connected to said POWER COMBINER for amplifying said filtered combined L1/L2 signal;

a POWER SPLITTER 2 connected to said FILTER /LNA and to said frequency/synthesizer for power splitting said L1/L2 signal into two signals;

a first MULTIPLIER connected to said POWER SPLITTER 2 for multiplying said L1 signal with said first local oscillator signal LO1 signal, wherein a first mixed signal is produced;

a second MULTIPLIER connected to said POWER SPLITTER for multiplying said L2 signal with said first local oscillator signal LO1 signal, wherein a second mixed signal is produced;

a first BANDPASS FILTER connected to said first MULTIPLIER for filtering said first mixed signal;

a second BANDPASS FILTER connected to said second MULTIPLIER for filtering said second mixed signal;

a first AMPLIFIER connected to said first BANDPASS FILTER for amplifying said first filtered signal; and a second AMPLIFIER connected to said second BANDPASS FILTER for amplifying said second filtered signal.

22. The apparatus of claim 20, wherein said DOWNCONVERTER AND IF PROCESSOR AND SAMPLING BLOCK further comprises an IF PROCESSOR AND SAMPLING BLOCK further comprising:

a first POWER SPLITTER connected to said DOWNCONVERTER and to said FREQUENCY SYNTHESIZER 2 for power splitting said L1 signal into two signals;

a second POWER SPLITTER connected to said DOWNCONVERTER and to said FREQUENCY SYNTHESIZER 2 for power splitting said L2 signal into two signals;

a first MULTIPLIER for multiplying said L1 signal with an inphase (I) version of said second local oscillator signal LO2 signal to produce an IL1 signal;

a second MULTIPLIER for multiplying said L1 signal with a quadrature (Q) version of said second local oscillator signal LO2 signal to produce a QL1 signal;

a third MULTIPLIER for multiplying said L2 signal with an inphase (I) version of said second local oscillator signal LO2 signal to produce an IL2 signal;

a fourth MULTIPLIER for multiplying said L2 signal with a quadrature (Q) version of said second local oscillator signal LO2 signal to produce a QL2 signal;

a first FILTERING CIRCUIT connected to said first MULTIPLIER for filtering said IL1 signal;

a second FILTERING CIRCUIT connected to said second MULTIPLIER for filtering said QL1 signal;

a third FILTERING CIRCUIT connected to said third MULTIPLIER for filtering said IL2 signal;

a fourth FILTERING CIRCUIT connected to said fourth MULTIPLIER for filtering said QL2 signal;

a first AMPLIFIER connected to said first FILTERING CIRCUIT for amplifying said IL1 signal;

a second AMPLIFIER connected to said second FILTERING CIRCUIT for amplifying said QL1 signal;

a third AMPLIFIER connected to said third FILTERING CIRCUIT for amplifying said IL2 signal;

a fourth AMPLIFIER connected to said fourth FILTERING CIRCUIT for amplifying said QL2 signal;

a first one-bit analog-to-digital (A/D) CONVERTER connected to said first AMPLIFIER for performing 1-bit quantization operation on said IL1 signal;

a second one-bit analog-to-digital (A/D) CONVERTER connected to said second AMPLIFIER for performing 1-bit quantization operation on said QL1 signal;

a third one-bit analog-to-digital (A/D) CONVERTER connected to said third AMPLIFIER for performing 1-bit quantization operation on said IL2 signal;

a fourth one-bit analog-to-digital (A/D) CONVERTER connected to said fourth AMPLIFIER for performing 1-bit quantization operation on said QL2 signal;

a first FLIP-FLOP (FF1) connected to said first one-bit A/D CONVERTER for sampling said IL1 signal, wherein said sampling operation is performed by clocking said IL1 signal through said FF1 at sampling clock (SCLK) rate;

a second FLIP-FLOP (FF2) connected to said second one-bit A/D CONVERTER for sampling said QL1 signal, wherein said sampling operation is performed by clocking said QL1 signal through said FF2 at sampling clock (SCLK) rate;

a third FLIP-FLOP (FF 3) connected to said third one-bit A/D CONVERTER for sampling said IL2 signal, wherein said sampling operation is performed by clocking said IL2 signal through said FF 3 at sampling clock (SCLK) rate; and a fourth FLIP-FLOP (FF 4) connected to said fourth one-bit A/D CONVERTER for sampling said QL2 signal, wherein said sampling operation is performed by clocking said QL2 signal through said FF 4 at sampling clock (SCLK) rate.

23. The apparatus of claim 20, wherein each said DELAYED CORRELATION PROCESSOR further comprises:

an L1 TRACKER for performing delayed correlation on the L1 Y code signal;

an L2 TRACKER connected to said L1 TRACKER for performing operations on the L2 Y code signal;

wherein said $\mu$P SYSTEM 2 is connected to said L1 TRACKER and to said L2 TRACKER; and wherein said L1 TRACKER is fed by digitized inphase IL1 and quadrature QL1 of said real time L1 signal; and wherein said L2 TRACKER is fed by digitized inphase IL2 and quadrature QL2 of said real time L2 signal; and wherein said L1 TRACKER and said L2 TRACKER are being fed by each said delayed satellite signal $W_i$ at said W SYNC$_i$ rate from said RESYNCHRONIZING MEMORY block; and wherein each said L1 and L2 TRACKER are synchronously clocked by said SCLK signal and synchronously referenced by said MSEC signal to local reference time; said SCLK and said 1 kHz reference signal MSEC being outputted by said FREQUENCY SYNTHESIZER; and wherein said $\mu$P SYSTEM 2 is fed by output signals from said L1 TRACKER and said L2 TRACKER; and wherein said L1 TRACKER and said L2 TRACKER are fed by CONTROL signal from said $\mu$P SYSTEM 2.

24. The apparatus of claim 23, wherein said L1 TRACKER further comprises:

a carrier numerically controlled oscillator (CARRIER NCO 2);

a CARRIER MIXER 2 connected to said CARRIER NCO 2 for multiplying said real time digitized inphase IL1 and Q L1 signals having carrier frequency with inphase and quadrature components of digital carrier; wherein when tracking the L1 C/A code said CARRIER MIXER 2 outputs in its I channel a maximum of L1 C/A code signal power and outputs in its Q channel a maximum of L1 Y code signal power;

a CODE GENERATOR 2 for providing a locally generated replica of C/A code, P code, and clocking signal W SYNC;

a CODE MIXER 3 connected to said CARRIER MIXER 2, connected to said CODE GENERATOR 2, and connected to said CARRIER NCO 2 for code correlating the output signals from said CARRIER MIXER 2 with said locally generated replica of C/A code; wherein, when said L1 TRACKER's carrier tracking loop is closed via said CARRIER NCO 2, the input to said CODE MIXER 3 represents the satellite real time signal L1 C/A code; and wherein said CODE MIXER 3 performs said code correlation at 3 time points (early, punctual and late) on the autocorrelation function graph creating an early, a punctual and a late sample of the autocorrelation function;

a block CORRELATORS 2 connected to said CODE MIXER 3 for integrating said early, punctual and late samples of said autocorrelation function; wherein said CORRELATORS 2 output signal is fed to said $\mu$P SYSTEM 2 at a rate of L1 C/A code epoch, and wherein said $\mu$P SYSTEM 2 uses said CORRELATORS 2 output signal to develop feedback signals for the carrier tracking loop and for the code tracking loop;

a code numerically controlled oscillator (CODE NCO 2) connected to said block CORRELATORS 2 and connected to said CODE GENERATOR 2 for providing a clocking signal at C/A code rate and for providing a clocking signal at P code rate; said C/A code clocking signal and said P code clocking signal driving said CODE GENERATOR 2; said CODE NCO 2 also providing a mechanism for aligning said locally generated replica of C/A code with said incoming satellite C/A code;

a CODE MIXER 4 connected to said CARRIER MIXER 2 and connected to said CODE GENERATOR 2, said CARRIER MIXER 2 outputting I and Q estimates of L1 Y code as an input to said CODE MIXER 4, said CODE GENERATOR 2 outputting said local replica of known L1 P code as input to said CODE MIXER 4, wherein said CODE MIXER 4 removes known L1 P code from said I and Q estimates of L1 Y code and outputs I and Q estimates of L1 W code;

a W BIT EXTRACTOR 2 connected to said CODE MIXER 4 for integrating the I and Q estimates of L1 W code across the period 22 P(Y) clocks;

a MEMORY 1 block connected to said W BIT EXTRACTOR 2 for storing the L1 W code bits outputted by said W BIT EXTRACTOR 2;

a CODE MIXER 5 connected to said MEMORY 1 block and connected to said RESYNCHRONIZING MEMORY 2 block for mixing the locally generated L1 W code estimates with the corresponding portion of said delayed combined estimate of W code signal; and a block CORRELATORS 3 connected to said CODE MIXER 5 block and connected to said $\mu$P SYSTEM 2 for integrating the outputs of said CODE MIXER 5 block, wherein said CORRELATORS 3 are read by said $\mu$P SYSTEM 2 periodically to allow tracking of the L1 Y code signal and carrier tracking loops via said CODE NCO 2 and said CARRIER NCO 2 respectively.

25. The apparatus of claim 23, wherein said L2 TRACKER further comprises:

a carrier numerically controlled oscillator (CARRIER NCO 3);

a CARRIER MIXER 3 connected to said CARRIER NCO 3 for multiplying said real time digitized inphase IL2 and Q L2 signals having carrier frequency with inphase and quadrature components of digital carrier;

a CODE GENERATOR 3 for providing a locally generated replica of P code and clocking signal W SYNC;

a code numerically controlled oscillator (CODE NCO 3) connected to said CODE GENERATOR 3 for providing a clocking signal at P code rate for driving said CODE GENERATOR 3;

a CODE MIXER 6 connected to said CARRIER MIXER 3 and connected to said CODE GENERATOR 3, said CARRIER MIXER 3 outputting I and Q estimates of L2 Y code as an input to said CODE MIXER 6, said CODE GENERATOR 3 outputting said local replica of known L2 P code as input to said CODE MIXER 6, wherein said CODE MIXER 6 removes known L2 P code from said I and Q estimates of L2 Y code and outputs I and Q estimates of L2 W code;

a W BIT EXTRACTOR 3 connected to said CODE MIXER 6 for integrating the I and Q estimates of L2 W code outputted by said CODE MIXER 6 across the period 22 P(Y) clocks;

a MEMORY 2 block connected to said W BIT EXTRACTOR 3 for storing the L2 W code bits outputted by said W BIT EXTRACTOR 3;

a CODE MIXER 7 connected to said MEMORY 2 block and connected to said RESYNCHRONIZING MEMORY 2 block for mixing the locally generated L2 W code estimates with the corresponding portion of said delayed combined estimate of W code signal; and a block CORRELATORS 4 connected to said CODE MIXER 7 block and connected to said $\mu$P SYSTEM 2 for integrating the outputs of said CODE MIXER 7 block, wherein said CORRELATORS 4 are read by said $\mu$P SYSTEM 2 periodically to allow tracking of the L2 Y code signal and carrier tracking loops via said CODE NCO 3 and said CARRIER NCO 3 respectively.

26. A method for performing a full correlation operation on encrypted satellite signals generated by a Satellite Positioning System (SATPS), said method comprising the steps of:

(a) receiving encrypted satellite signals from a first SATPS satellite by a first HIGH GAIN ANTENNA (HGA), from an i-th SATPS satellite by an i-th HIGH GAIN ANTENNA (HGA), from an N-th SATPS satellite by an N-th HIGH GAIN ANTENNA (HGA), i being an integer less or equal to N, N being a number of satellites being observed;

(b) extracting, resynchronizing, delaying and combining a W bit information from said received encrypted signals;

(c) transmitting said extracted delayed and combined W bit information;

wherein said steps (a) through (c) are performed by a CENTRAL STATION;

(d) receiving encrypted real time L1 and L2 satellite code signals;

(e) storing the observed samples of said received encrypted satellite L1 and L2 satellite signals;

(f) receiving said extracted delayed and combined W bit information transmitted by said CENTRAL STATION; and (g) correlating said stored samples of said received encrypted L1 and L2 signals with the corresponding portions of said delayed and combined W bit information transmitted by said CENTRAL STATION;

wherein said steps (d) through (g) are performed by a DELAYED W CORRELATION RECEIVER.

* * * * *